United States Patent [19]
Ahmed

[11] Patent Number: 5,440,405
[45] Date of Patent: Aug. 8, 1995

[54] METHOD AND SYSTEM FOR ERROR CORRECTION USING ASYNCHRONOUS DIGITAL FACSIMILE PROTOCOL

[75] Inventor: Allam Z. Ahmed, Santa Clara, Calif.

[73] Assignees: Ricoh Company, Ltd., Tokyo, Japan; Ricoh Corporation, San Jose, Calif.

[21] Appl. No.: 95,292

[22] Filed: Jul. 21, 1993

Related U.S. Application Data

[63] Continuation-in-part of Ser. No. 939,612, Sep. 2, 1992.

[51] Int. Cl.⁶ .................. H04N 1/32; H04N 1/333
[52] U.S. Cl. ................... 358/435; 358/405; 358/436
[58] Field of Search .............. 358/405, 434, 435, 436, 358/438, 439

[56] References Cited

U.S. PATENT DOCUMENTS

| | | | |
|---|---|---|---|
| 3,506,785 | 4/1970 | Harris | 178/69.5 |
| 3,894,185 | 7/1975 | Vieri | 178/69.5 |
| 4,251,836 | 2/1981 | Moreau | 358/264 |
| 5,050,006 | 9/1991 | Ogawa | 358/440 |
| 5,125,025 | 6/1992 | Lim | 358/434 X |
| 5,293,253 | 3/1994 | Kida et al. | 358/440 |

*Primary Examiner*—Bentsu Ro
*Attorney, Agent, or Firm*—Albert C. Smith

[57] ABSTRACT

Communication system and method including a calling apparatus and a called apparatus. The system comprises handshake means for exchanging negotiation information including error correction ECM capabilities data, contained in a plurality of command frames between the calling apparatus and the called apparatus. The system further includes means for initiating an error correction operation, a transmitter for transmitting and receiving between the calling and the called apparatus a data set having associated data frame identification information, and verification means for verifying receipt of the data set. A method corresponding to the system also is described.

16 Claims, 27 Drawing Sheets

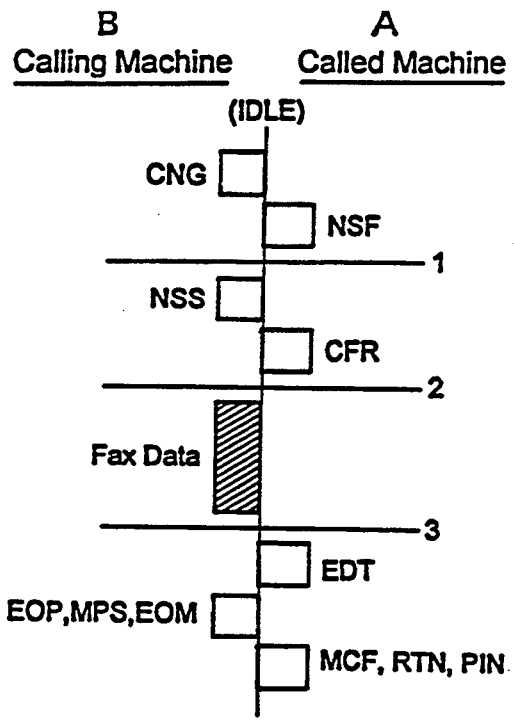
FIGURE 3A
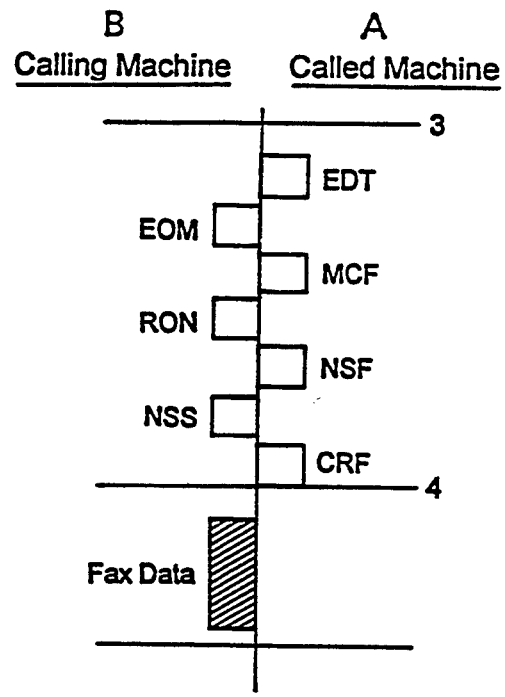
FIGURE 3B
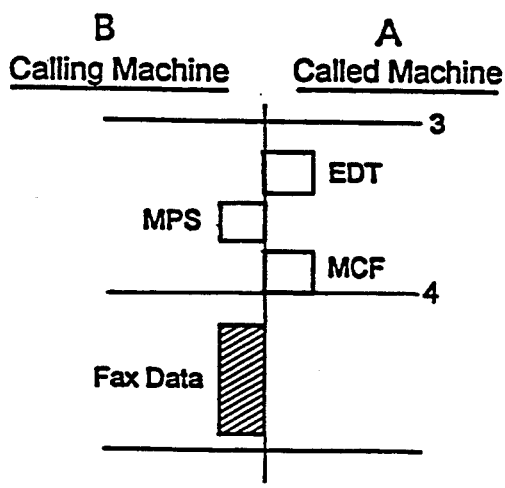
FIGURE 3C
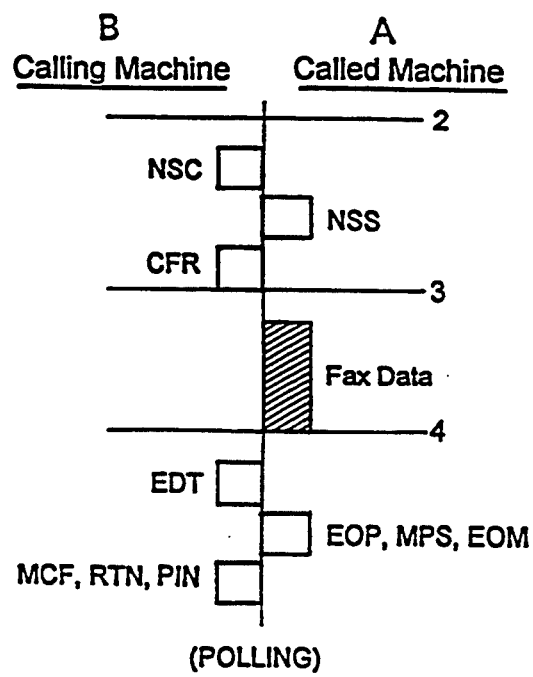
FIGURE 3D
FIGURE 3 (Prior Art)

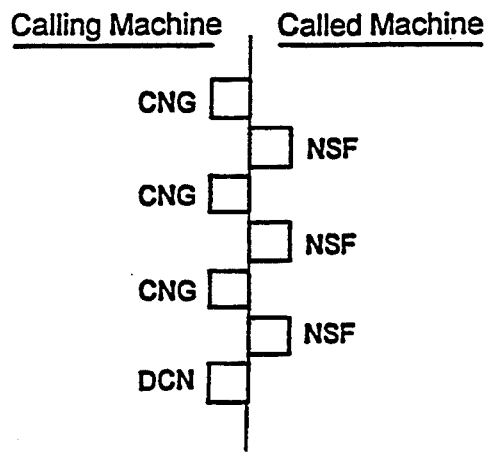
FIGURE 4A
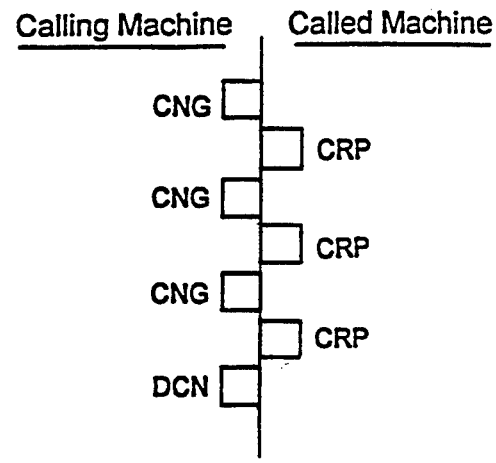
FIGURE 4B
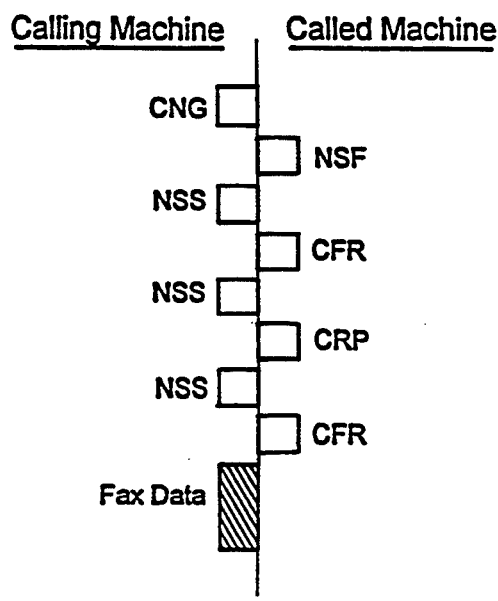
FIGURE 4C
FIGURE 4
(Prior Art)

METHOD AND SYSTEM FOR ERROR CORRECTION USING ASYNCHRONOUS DIGITAL FACSIMILE PROTOCOL

RELATED CASES

This application is a continuation-in-part of U.S. Ser. No. 07/939,612, filed 2 Sep. 1992, and entitled "Negotiation Method and Apparatus Enabling a Facsimile Machine to Use Async Data Communication Protocols".

FIELD OF THE INVENTION

This invention relates generally to facsimile machines, and more particularly to facsimile machines for use with asynchronous data communication protocols.

BACKGROUND OF THE INVENTION

Facsimile machines (or FAX) were initially designed to transmit and receive data over the Public Switched Telephone Network (PSTN) analog system in accordance with standardized data communication protocols. Frequently used data communication protocols include Group 1 (G1), Group 2 (G2) and Group 3 (G3).

In the PSTN system, these three protocols are traditionally used in a synchronized fashion, where the time interval between image data and command, or the time interval between two commands is pre-determined by the protocols.

FIG. 1 depicts a typical G3 multi-page fax data communication process having changes of image parameters in a normal operation mode over the PSTN system. In FIG. 1, CED stands for Called Station Identification, NSF stands for Non-Standard Facilities, CSI stands for Called Subscriber Identification, DIS stands for Digital Identification Signals, DCS stands for Digital Command Signals, TSI stands for Transmitting Subscriber Identification, CFR stands for Confirmation to Receiver, EOM stands for End of Message, MCF stands for Message Confirmation, EOP stands for End of Procedure, and DCN stands for Disconnect Signal.

In FIG. 1, the blocks at the left hand (calling) side represent a sequence of events performed by a calling machine, while the blocks at the right hand (called) side represent a sequence of events performed by a called machine. This principle also applies to FIGS. 2, 3A–D, 4A–C, 12A–B, and 13A–B.

With reference to FIG. 1, the communication process is initiated by a telephone call from the calling machine. After acknowledging a valid call, the called machine responds with a Non-standard Facilities (NSF) frame. The calling machine then responds with the Non-Standard Setup (NSS) frame, advising the called machine of the resolution and compression for a page of fax data, or a frame of fax data, to follow. If an NSS frame is not received within 3 seconds, the called machine retransmits the NSF frame. A maximum of three NSF tries is attempted before the calling machine signals a failure. On the other hand, once the NSS frame is received, the called machine transmits a Confirmation to Receive (CFR) frame. The calling machine then starts to transmit the fax data page. At the end of the transmission of the fax data page, the calling machine, which is a transmitter, typically transmits an End of Message (EOM) frame within 3.5 seconds. The EOM frame indicates that the calling machine will transmit an additional page of fax data with change of parameters to follow. If the additional page of fax data are to be transmitted without change of parameters, an Multi-Page Signal (MPS) frame is transmitted. If there are no more pages of fax data, an End of Procedure (EOP) frame is transmitted.

With further reference to FIG. 1, after receiving the EOM frame the called machine responds with an Message Confirmation (MCF) frame and transmits an NSF frame to the calling machine within 6 seconds. After receiving both the MCF and NSF frames, the calling machine responds to the called machine by transmitting an NSS frame, informing the called machine of the new parameters for the forthcoming fax data page. The called machine confirms with a CFR frame. The calling machine then transmit the additional page of fax data. At the end of the data transmission, the calling machine transmits an EOP frame, signaling no more image data to transmit. The called machine then returns an MCF frame. Finally, the calling machine transmits the Disconnect (DCN) frame, and the transaction is terminated. As depicted in FIG. 1, the maximum time allowed between two command frames is 6 seconds.

It should be noted that the time schedule in FIG. 1 is exemplary only, since the actual sequence of events and timings varies during each specific facsimile call setup. The actual sequence of events and timings during image data communication also varies with ranges and options specified by the CCITT (International Telegraph and Telephone Consultative Committee).

Even though the synchronized G3 protocol facilitates facsimile data communication over the PSTN system, it does not permit data communication over asynchronous digital data networks. Asynchronous communication is thwarted because the time interval between two command frames, or between a command frame and a data frame, is pre-determined by the G3 protocol.

Specifically, the G3 protocol assumes that, after the transmitting side transmits one page of fax data, the receiving side will process the page of fax data in First In First Out (FIFO) order, within a pre-determined period of time (typically 3 seconds).

As shown in FIG. 1, when a page of fax data has been sent by a G3 transmitting facsimile machine in the PSTN system, an EOM (End of Message) command is sent out 3.5 seconds later. A post message transmission, such as MCF, then is initiated. In the G3 protocol, a RTC (Return To Control) sequence including six EOLs (End of Lines) is embedded at the end of a page of fax data. Consequently, the G3 transmitting facsimile machine typically transmits the EOM command with the assumption that the receiving side has completed processing the received page of fax data, and detected the RTC within 3.5 seconds.

However, in asynchronous digital data networks (such as a closed telephone network using leased lines), delays caused by buffering and multiplexing hardware in the asynchronous digital networks often are found. Thus, it cannot be assumed that the receiving side can complete processing a page of received fax data and the RTC within the pre-determined period of time.

Also, in the PSTN system, after the transmitting side has sent out a command frame, the G3 protocol assumes that the receiving side can respond to the command frame within a pre-determined period of time. If the receiving side fails to respond to the command frame within the pre-determined period of time, the transmitting side typically performs a retry of the command frame.

Further, in G3 protocol, it is possible for either transmitting side or receiving side to send two consecutive command frames with an assumption that the maximum time for processing the preceding command frame will not exceed a pre-determined period of time. For example, the receiver side consecutively generates MCF and NSF command flames within ±6 seconds between these two command frames. Without a mechanism to provide positive acknowledgment between calling and called machines, the time period between the two consecutive commands has to be assumed, as in PSTN.

But, in the asynchronous digital data networks, it cannot be assumed that the receiving side can respond to a transmitted command frame within a pre-determined period of time. As noted, no such assumption is warranted due to the delays caused by the asynchronous digital data network hardware.

To adapt facsimile machines to the asynchronous digital data networks, Ricoh Corporation developed an asynchronous facsimile protocol, which is denoted Ricoh IDI (Image Data Interchange) FAX R-2100 protocol (referred to as IDI protocol hereinafter). The IDI protocol achieves compatibility with a large number of existing asynchronous digital data networks while retaining the features and conventions of the widely accepted G3 facsimile terminals.

The IDI protocol successfully adds a mechanism to the G3 protocol to compensate for the delays caused by hardware in the asynchronous digital data network, e.g., buffering and multiplexing hardware. To adapt the IDI protocol, Ricoh Corporation also developed a model of facsimile machines (called R-2100 facsimile machines). The IDI protocol successfully connects R-2100 facsimile machines to the asynchronous digital data networks.

"Negotiation" refers to a bilateral information exchange between a calling facsimile machine and a called facsimile machine. A typical facsimile image may include the information that defines various image parameters, such as data compression technique, resolution, tolerance, scan line length, scanning direction, scanned line transmission time, contrast levels, etc.

Specifically, the G1, G2, and G3 protocols provide low, medium, and high resolutions (or scanning densities). The low resolution provides 3.85 lines per mm (vertical) by 864 picture elements along the horizontal scan line (or 100 by 100 lines per inch). The medium resolution provides 3.85 lines per mm (vertical) by 1728 picture elements along the horizontal scan line (or 100 by 200 lines per inch). The high resolution provides 7.7 lines per mm (vertical) by 1728 picture elements along the horizontal scan line (or 200 by 200 lines per inch).

The G3 protocol further provides two coding schemes both a one-dimension coding scheme, and a two-dimension coding scheme. The one-dimension coding scheme is essentially Modified run-length Huffman Code (MH), while the two-dimension coding scheme is essentially Modified Relative Element Address Designate (READ) Code (MR).

A typical facsimile machine may have limited capabilities to adapt to specific configurations of these parameters. Thus, a negotiation process can be used to determine parameters suitable to the capabilities for both the calling facsimile and the called facsimile machines, thus facilitating fax data transmission.

Unfortunately, IDI protocol does not provide a mechanism to perform such negotiation. As a result, even though R-2100 model facsimile machines can efficiently communicate with each other over the asynchronous digital data network in accordance with IDI protocol, they lack negotiation capability.

As a result, under the IDI protocol, the transmitter operates as a master, driving the receiver to accept the resolution and compression technique set at the transmitting side. The Non-Standard Setup frame (NSS) transmitted by the transmitter commands the receiver regarding the resolution and compression to be utilized in the subsequent transmitted fax data. The receiver accordingly adjusts itself to accept the fax data.

Initially, when IDI protocol was first developed, lack of negotiation capability did not cause problems because Ricoh Corporation was the only manufacturer to produce asynchronous protocol adaptable facsimile machines (R-2100 facsimile machines). When only one model of asynchronous protocol adaptable facsimile machines is available in the market, these facsimile machines can properly communicate with each other, even without negotiation capability. Subsequently, Ricoh Corporation produced (and continues to produce) new models of facsimile machines that can adapt to the asynchronous facsimile protocol. Other manufacturers have followed Ricoh Corporation's asynchronous facsimile protocol, and also have produced facsimile machines that adapt to the asynchronous facsimile protocol. Without negotiation capability, facsimile machines will encounter problems when communicating with facsimile machines of different models. Further, newer facsimile protocols, such as Group 4 (G4) protocol, have more features than G1, G2 and G3 protocol. Without negotiation capability, it is difficult to incorporate desirable new features into asynchronous facsimile protocols.

Even with a negotiation capability, it is important to identify and perform error correction in an asynchronous environment. In a noisy data transmission environment such as an asynchronous digital data network, it is particularly important to incorporate some form of error detection and correction during transmission.

Thus, there is a need to provide facsimile machines with negotiation capability including error detection and correction, and to provide an associated method, that adapts to an asynchronous facsimile protocol. This invention provides such facsimile machines and method.

SUMMARY OF THE INVENTION

In the first respect, the invention provides a novel communication system which includes a calling apparatus and a called apparatus for transmitting data there between over an asynchronous digital network during a transmitting process in accordance with a protocol standard. The calling apparatus and the called apparatus generate a plurality of command frames and at least one data frame during the transmitting process. The command and data frames generated by the calling apparatus have a one-to-one correspondence to the command and data frames generated by said called apparatus.

The system comprises handshake means for exchanging negotiation information, including error correction ECM capabilities data, contained in a plurality of command frames between the calling apparatus and the called apparatus; means for initiating an error correction operation; a transmitter for transmitting and receiving between the calling and the called apparatus a data set having associated data frame identification information; and verification means for verifying receipt of the data set.

According to the system of this invention, the calling apparatus and the called apparatus can perform negotiation via the asynchronous digital data network during a data transmission process.

This invention also provides a respective method corresponding to the system described.

BRIEF DESCRIPTION OF THE DRAWINGS

The purpose and advantages of this invention will be apparent to those skilled in the art from the following detailed description in conjunction with the appended drawings in which:

FIGS. 3A, 3B, 3C and 3D depict several data communication situations over an asynchronous digital data network, in accordance with Ricoh IDI FAX R-2100 protocol.

FIGS. 4A, 4B and 4C depict several data communication error situations over an asynchronous digital data network in accordance with Ricoh IDI FAX R-2100 protocol.

DETAILED DESCRIPTION OF PREFERRED EMBODIMENTS

Figure 1:
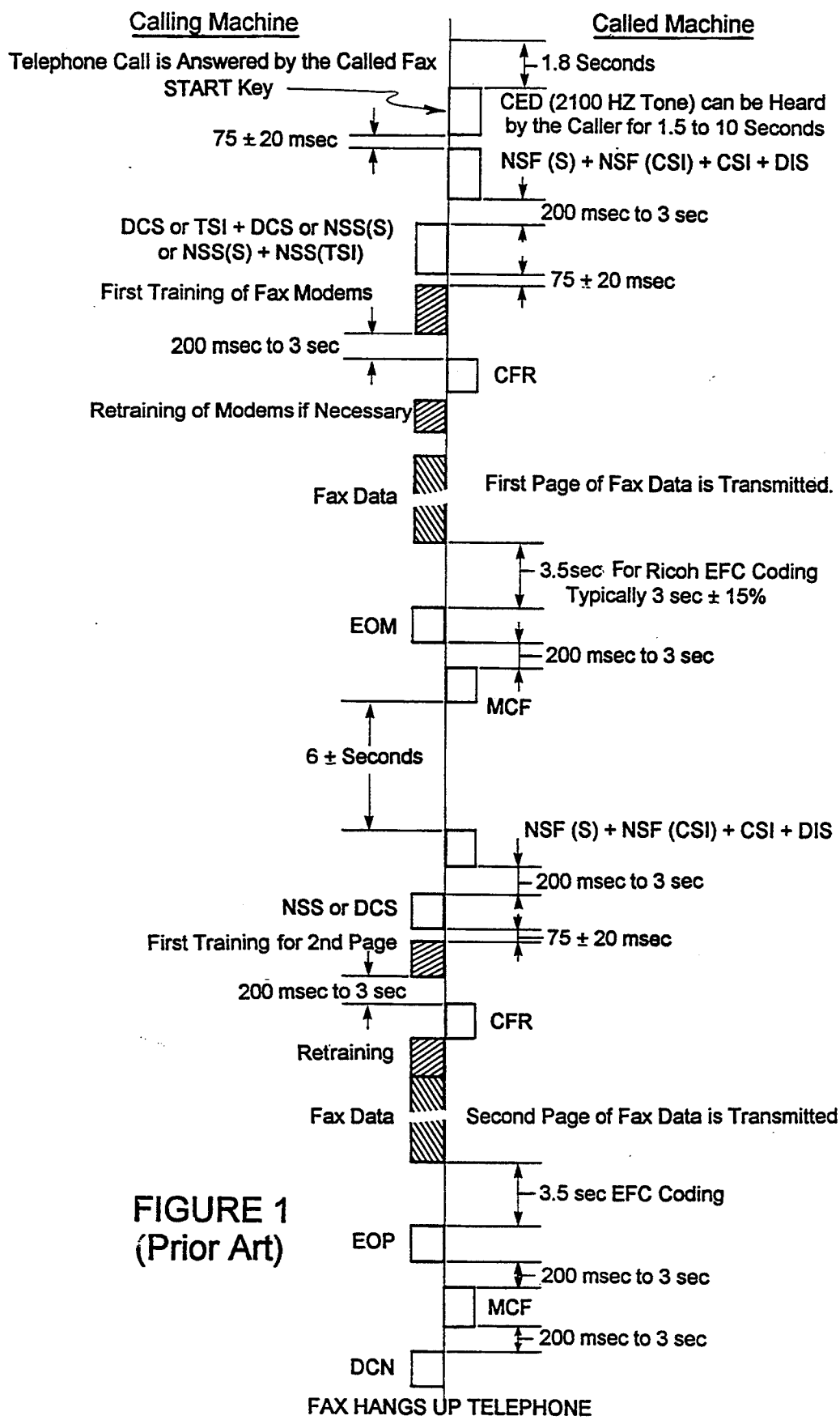
FIG. 1 depicts a typical data communication process over the Public Switched Telephone Network (PSTN), in accordance with the G3 protocol.

This invention comprises a novel facsimile machine and an associated method. The following description is presented to enable any person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, the invention is not intended to be limited to the embodiments shown, but is to be accorded the widest scope consistent with the principles and features disclosed herein.

A. The IDI Protocol and R-2100 Facsimile Machine

To better appreciate this invention, it is helpful first to describe the operation of IDI protocol. Essentially, IDI protocol adds two new commands to the G3 protocol: End of Data Detect (EDT) and Request Next Command (RQN). The IDI protocol also uses two optional commands provided by the G3 protocol: Calling Request (CNG) and Command Repeat (CRP).

To facilitate the description that follows, the major commands used in IDI protocol are as follows:

| Symbol | Hex Code | Function |
|---|---|---|
| CNG | 00000001 | Calling Command |
| NSF | 00000010 | Non Standard Facilities |
| NSS | 00000011 | Non Standard Setup |
| NSC | 00001011 | Non Standard fac Command |
| EOP | 00000100 | End of Procedure |
| MPS | 00000101 | Multi-Page Signal |
| EOM | 00000110 | End Of Message |
| MCF | 00000111 | Message Confirmation |
| CFR | 00001000 | Confirmation to Receive |
| RTN | 00001001 | Retrain Negative |
| PIN | 00001010 | Procedure Interrupt Neg. |
| EDT | 00001100 | End of page Detection |
| CRP | 00001101 | Command repeat Request |
| RQN | 00001110 | Request Next Command |
| DCN | 10000111 | DisCoNnect message |

In PSTN, the "dialing-and-ring" wakes up the called machine, but in the asynchronous digital data networks, there is no concept of "dialing". Thus, in an asynchronous digital data network, the terminals address each other using ASCII codes because the asynchronous digital networks were originally designed as computer networks. However, when the IDI protocol was first developed, there were no facsimile machines that had capability to address ASCII codes over asynchronous digital networks. Thus, the IDI protocol uses the CNG frame to wake up a called facsimile machine.

As described above, in synchronous G3 protocol, the transmitting side assumes: (1) the receiver will complete processing a page of fax data within a pre-determined period of time after an EOM command has been transmitted, and (2) the receiver will respond within a pre-determined period of time after the command frame has been transmitted.

For the G3 adaptable facsimile machines, if the receiver side does not respond to a command frame within a pre-determined period of time after the command frame has been transmitted by the transmitting side, the transmitting side typically performs a retry of the command frame.

However, these two assumptions are inapplicable to an asynchronous digital data network, due to the delays caused by the asynchronous digital network hardware and data flow control.

The Ricoh IDI protocol essentially has a one-to-one correspondence. That is, for every command frame or data frame, there is a positive acknowledgment. This, in effect, guarantees that the command frame or data frame transmitted has been received correctly, without imposing time penalty on the protocol proceeding.

Since asynchronous network time delays can vary, data transmitted can be received after a variable period of time. Also, network specific data flow control can add further delay time uncertainty. Hence, the transmitter cannot have a fixed time delay period, but rather requires a positive acknowledgment of data received. For example, an average FAX image transmission takes 20 to 25 seconds. The RTC that signals the end of data is embedded at the end of a fax data page. Due to the network delays and network specific flow control, there might be an additional time delay of 1–180 seconds before data reaches the receiver side. If the transmitter always waited blindly for 180 seconds before transmitting the next command frame, much of this wait would be redundant for a network having a time delay less than 180 seconds. Therefore, it would be preferable to have a positive acknowledgment from the receiver signaling RTC detection, whereupon the transmitter could send the next command frame. By adding two new command frames (EDT and RQN) and using one optional command frame (CRP), IDI protocol guarantees a one-to-one correspondence.

According to the IDI protocol, the transmitting or receiving side performs a retry of a command frame only when such retry is requested by the other side. To handle error situations, the IDI protocol uses the CRP frame to initiate a retry of a command frame. For example, if a transmitter sends a command frame to a receiver, and the received command frame is unsatisfactory (either the received command frame was a wrong command frame or a corrupted command frame), the receiver will generate a CRP frame, which requests the transmitter to perform a retry of the command frame. Upon receiving the CRP frame, the transmitting side will perform a retry of the command frame.

According to the IDI protocol, the EDT frame is the receiver generated command frame after the receiver has completed processing the received fax data page and has detected the RTC embedded in the received fax data page. By using the EDT command frame, the receiver can inform the transmitter that the processing of received fax data page is completed and the RTC is detected. Upon receiving the EDT command frame, the transmitter will start a post transmission.

The RQN frame is a transmitter generated command frame after the transmitter has sent an EOM command frame to a receiver, and the receiver sent back an MCF command frame. Upon receiving the RQN command frame, the receiver will send an NSF command frame to the transmitter.

Unlike the G3 protocol where either a transmitter or a receiver may consecutively transmit two command frames (or a command frame and a data frame), in the IDI protocol, the EDT, RQN and CRP command frames are so arranged to ensure that no two command frames (or a fax data frame and a command frame) are consecutively transmitted from either a transmitter or a receiver. Because time intervals between two consecutive command frames (or fax data frame and a command) cannot be assumed in asynchronous digital data networks, the IDI protocol's one-to-one approach is appropriate.

It should be appreciated that with the IDI protocol the time to establish a call in the asynchronous data network is dramatically shorter because the 1.5 to 10 second CED tone is eliminated.

Typically, connect-to-start-of-transmission-times for G3 adaptable facsimile machine in the PSTN system is 8 to 12 seconds. By contrast, typical time for R-2100 facsimile machines to arrive at the point where transmission starts is less than half a second.

Figure 2:
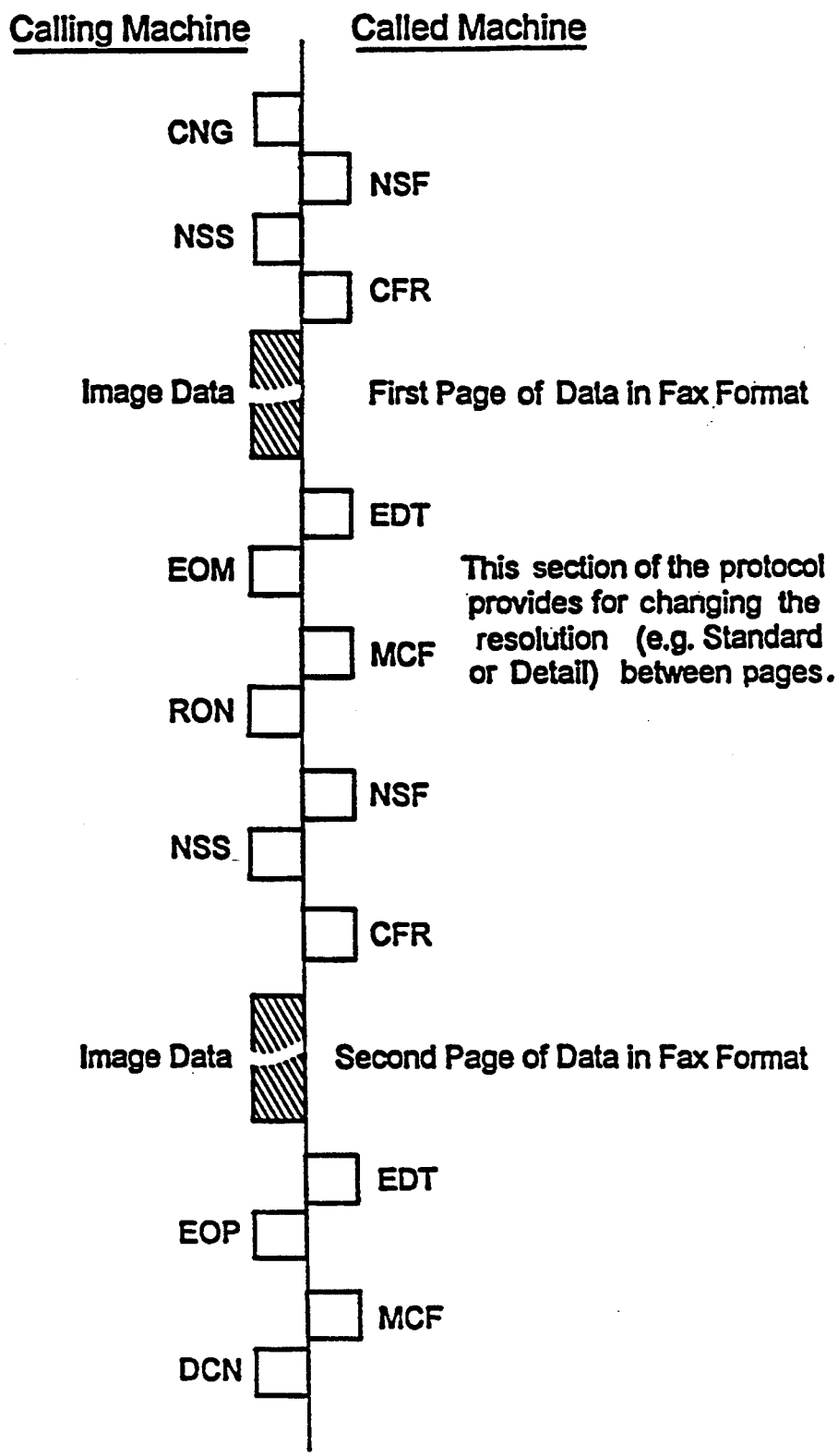
FIG. 2 depicts a typical data communication process over an asynchronous digital data network, in accordance with Ricoh IDI FAX R-2100 protocol.

FIG. 2 depicts a typical R-2100 multi-page fax data communication process with parameter changes. The introduction of EDT and RQN command renders the protocol one-to-one, hence making every command respond with a positive acknowledgment. The time period of re-trying a command frame is also preferably increased from 3 seconds in G3 protocol specification to 30 seconds in IDI protocol specification for R2100 facsimile machines.

It should be appreciated that the added EDT (End Detect) command frame is a positive acknowledgment to guarantee a page of fax data getting through the buffering and multiplexing hardware in the asynchronous digital data networks.

FIGS. 3A–3D depict the various R2100 operations in a normal mode and a polling mode. In a normal operation mode, shown in FIG. 3A, the calling machine is the data transmitter and the called machine is the data receiver. But in a polling operation mode, shown in FIG. 3D, after initializing a data communication process, the calling machine changes roles and becomes the data receiver. It is the called machine that transmits the data. Hence, if the called machine (A) is set for polling, the calling machine (B) can call machine (A) and request it to send data. Thus, the calling machine B, in effect, becomes the data receiver.

Specifically, FIG. 3A depicts a sequence of events for a data transmission process (a single page of fax data or multiple pages of fax data) in a normal operation mode. The events located above line 1 occur during a connection phase for establishing connection between a calling and a called machines. The events located between lines 1–2 occurs during a data preparation phase for setting suitable image parameters for the first fax data page. The event located between lines 2–3 occurs during a data transmission phase for the first fax data page. The events located below line 3 occur during a post transmission phase. The variations of the events occurring during the post transmission phase depends on: (1) whether subsequent fax data pages exist, and (2) whether the image parameters need to be changed for the subsequent fax data pages.

FIG. 3B depicts a sequence of events for transmitting a subsequent page of fax data with changed image parameters in a normal operation mode. The events located between lines 3–4 occur during a data preparation phase for the subsequent fax data page. The event located below line 4 occurs in a data transmission phase for the subsequent fax data page.

FIG. 3C depicts a sequence of events for transmitting a subsequent page of fax data without changes of image parameters in a normal operation mode. The events located between lines 3–4 occur during a data preparation phase for the subsequent fax data page. The event located below line 4 occurs in a data transmission phase for the subsequent fax data page.

FIG. 3D depicts a sequence of events for a data transmission process (a single page of fax data or multiple pages of fax data) in a polling operation mode. The events occurring during the connection phase are the same as those in FIG. 3A. The events located between lines 2–3 occur during a data preparation phase for setting suitable image parameters for a first fax data page. The event located between lines 3–4 occurs in a data transmission phase for the first fax data page. The events located below line 4 occur during a post transmission phase. Like in the normal operation mode, the variations of the events occurring during the post transmission phase depend on: (1) whether subsequent fax data pages exist, and (2) whether the image parameters need to be changed for the subsequent fax data pages.

FIGS. 4A–4C depict typical IDI protocol Command Repeat sequences. If the calling machine transmits an illegal CNG command frame or the line corrupts the command frame, then the receiver transmits a CRP command frame, requesting the caller to re-transmit the last command frame. A maximum of three tries are made before a DCN command frame is transmitted to terminate the transaction.

Specifically, FIG. 4A depicts a situation where a command frame from the called side causes consecutive errors; FIG. 4B depicts a situation where a command from the calling side causes consecutive errors; FIG. 4C depicts a situation where the first CFR causes an error.

B. Negotiation Capable IDI Protocol and Associated Facsimile Machine

To add negotiation capability to the IDI protocol, this invention encodes negotiation information into the IDI protocol to specify different asynchronous commands. Specifically, the present invention encodes the negotiation information into the CNG, NSF, NSS and NSC command frames of the IDI protocol.

In FIGS. 5A, 5B, 5C, 6, 9, 10A, 10B, 11A and 11C, star symbol "*" located at the left side of a command frame denotes that the command frame contains the encoded negotiation information.

Figure 5A:
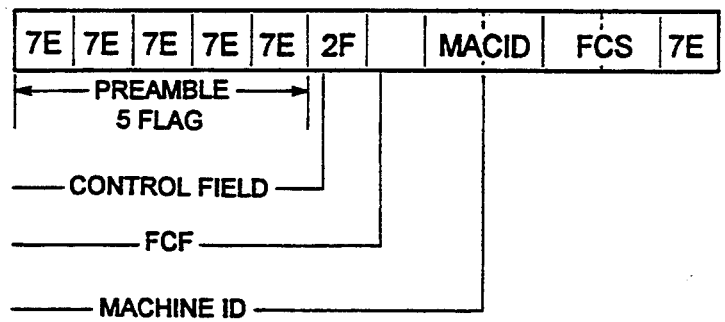
FIGS. 5A, 5B, and 5C depict the command frame formats in Ricoh IDI FAX R-2100 protocol.

FIG. 5A depicts the frame format for the CNG* frame in accordance with the invention, where fields 8 and 9 provide Machine Identification (MACID). The MACID's function is to provide machine identification that indicates whether the calling machine has negotiation capability. After identifying the calling machine, the called machine provides its capability information by sending out an NSF* frame.

Figure 5B:
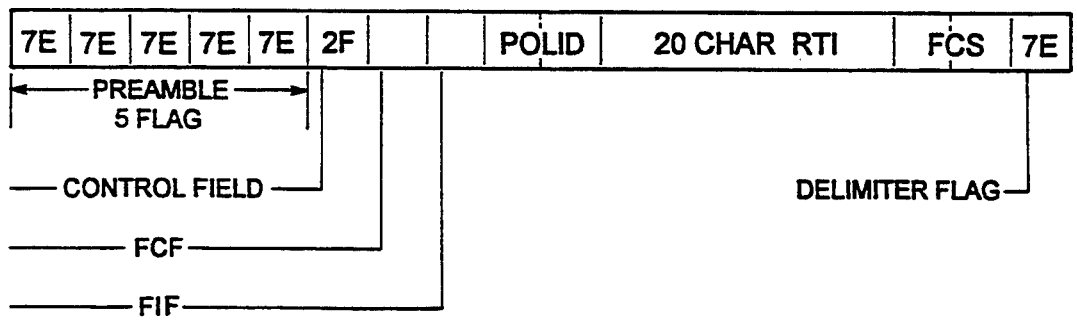
Figure 5C:
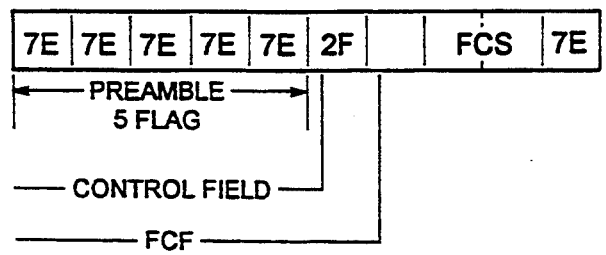

FIG. 5B depicts the frame format for the NSF*, NSS* and NSC* command frames in accordance with the invention. The invention encodes the negotiation information into the facsimile information field (FIF) of the NSF, NSS and NSC command frames of the IDI protocol. FIG. 5C depicts the frame format for all other commands, including MPS, EOM, EOP, MCF, CFR, RTN, PIN, EDT, CRP, RQN, DCN, RCP, RNR, RR, ERR, CTC, and CTR.

Figure 6:
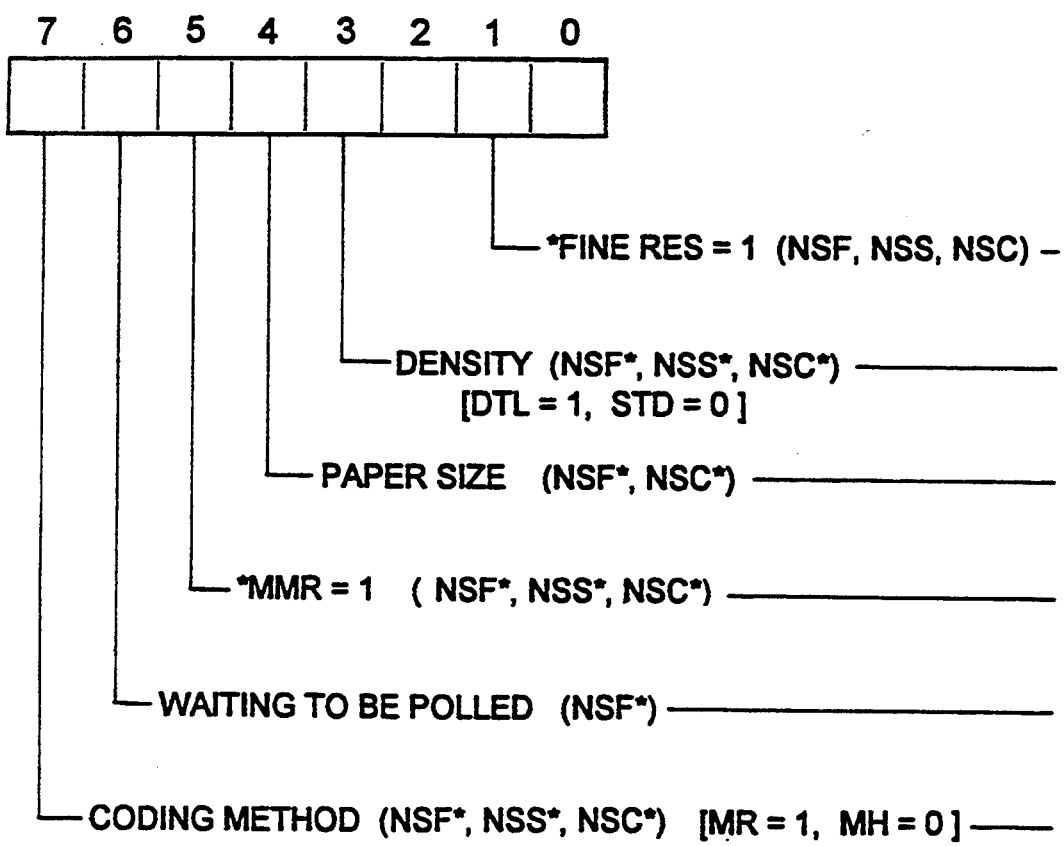
FIG. 6 depicts the content of facsimile information field (FIF), in accordance with the invention.

FIG. 6 depicts the eight-bit FIF field in further detail, in accordance with the invention. The functions of the 0th and 2nd bit are not defined. The 1st bit indicates resolution for the NSF*, NSS* and NSC* command frames. A "0" at the 1st bit indicates that the resolution is defined by the 3rd bit, and a "1" indicates fine resolution, which provides 7.7 lines per mm (vertical) by 3456 picture elements along the horizontal scan line (200 by 400 lines per inch). The 3rd bit indicates resolution for the NSF*, NSS* and NSC* command frames when the 1st bit is at "0". A 3rd bit "0" indicates STD resolution, and a "1" indicates DTL resolution. The 4th bit indicates paper size for NSF and NSC commands. The 5th bit indicates MMR coding method for the NSF*, NSS* or NSC* command frame. The MMR coding scheme is a modified relative element address designate (read) code. A 5th bit indicates non-MMR coding, and a "1" indicates MMR coding. The 6th bit indicates operation mode for the NSF* command frame. A "0" at the 6th bit indicates a normal operation mode, and a "1" indicates a polling operation mode. The 7th bit indicates coding method for the NSF*, NSS* and NSC* command frame. A "0" at the 7th bit indicates MH coding method, and a "1" indicates MR coding method.

Figure 7:
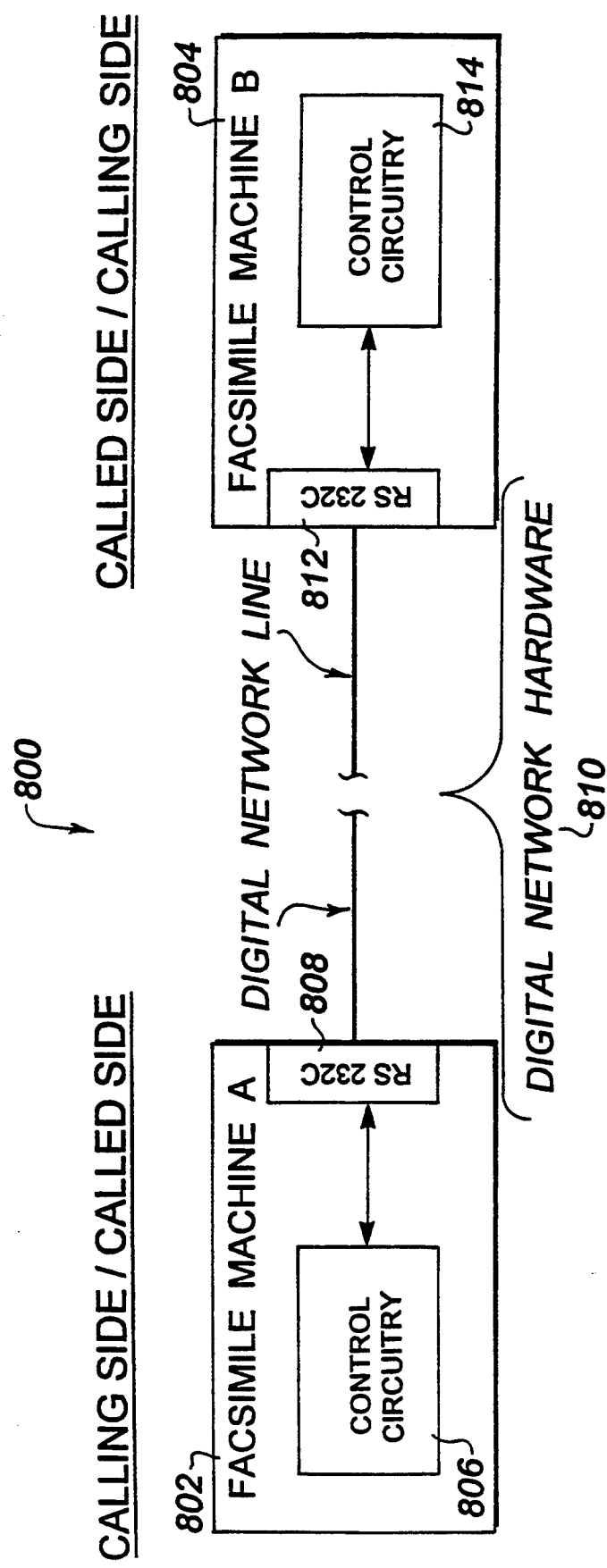
FIG. 7 depicts a facsimile communication system, in accordance with the invention.

FIG. 7 depicts a facsimile communication system wherein a facsimile machine A (802) and a facsimile machine B (804) are coupled to an asynchronous digital data network, in accordance with the invention. The two facsimile machines can communicate with each other over the asynchronous digital network in accordance with the IDI protocol as improved by the invention. Each of the two facsimile machines can act either as a calling terminal (at the calling side) or a called terminal (at the called side).

The facsimile machines A and B include control circuitry 806 and control circuitry 814, which include a serial port 808 and a serial port 804, respectively. The serial ports may be standardized RS 232C serial port.

Initially, the calling side control circuitry generates protocol (including negotiation information) and, the calling side serial port delivers the protocol to the called side serial port. The called side serial port in turn provides the received protocol to the called side control circuitry.

In response to the negotiation information sent by the calling side, the called side control circuitry generates response protocol (including negotiation information). This response protocol then is delivered to the calling side control circuitry via serial ports 812 and 808.

In response to the negotiation information sent by the called side, the calling side control circuitry further generates response protocol (including negotiation information), which is then delivered to the called side control circuitry via serial ports 808 and 812. The negotiation exchanges between the calling and called sides may repeat several times depending on the specific data communication process.

In a normal operation mode, the calling side control circuitry generates image data and sends the image data to the called side control circuitry. The called side control circuitry receives and decodes the image data. By contrast, in a polling operation mode, the called side control circuitry generates image data and sends the image data to the calling side control circuitry. The calling side control circuitry receives and decodes the image data.

Figure 8:
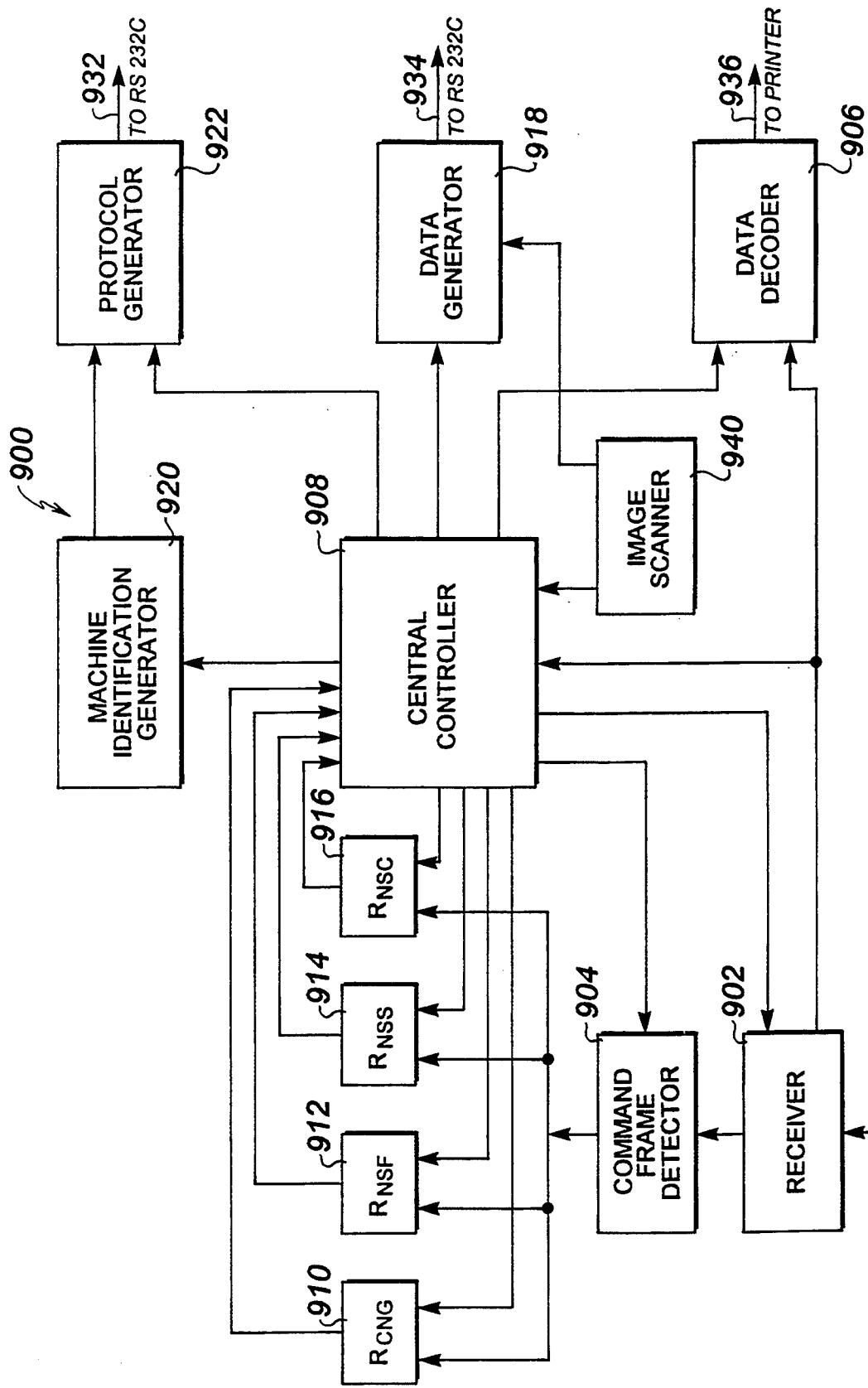
FIG. 8 depicts a block diagram of the control circuitry (806 or 814) shown in FIG. 7, in accordance with the invention.

FIG. 8 depicts control circuitry 806 or 814 in greater detail. The control circuitry includes a receiver 902, a command frame detector 904, four registers (910, 912, 914 and 916), a machine identification generator 920, a protocol generator 922, a data generator 918, a data decoder 906 and a image scanner 940. The control circuitry further includes a central controller 908 that controls over all activities of all the other elements in the control circuitry.

The operation of the control circuitry shown in FIG. 8 is as follows: receiver 902 receives signals from RS 232C serial port (808 or 812 shown in FIG. 8), and then provides the received signals to command frame detector 904, central controller 908 and data decoder 906.

Upon receiving signals from receiver 902, command frame detector 904 detects the command frames and extracts the negotiation information encoded in the command frames. While the output from command frame detector is simultaneously coupled to the inputs of the four registers (910, 912, 914 and 916), central controller 908 only activates one register at a specific moment. If a CNG* frame is detected, the command frame detector 904 stores the extracted negotiation information in register RCNG (910). If an NSF* frame is detected, the command frame detector 904 stores the extracted negotiation information in register RNSF (912). If an NSS* frame is detected, the command frame detector stores the extracted negotiation information in register RNSS (914), and if an NSC* frame is detected, the command frame detector 904 stores the extracted negotiation information in register RNSC (916). The outputs of the four registers (910, 912, 914 and 916) are coupled to central controller 908.

Image scanner 940 scans original image printed on medium (such as papers) into one or more pages of digital data, and provides the digital data to data generator 918. Image scanner 940 also provides control information to central controller 908. The control information indicates whether multiple pages of image data are involved, and whether changes of image parameters are needed. Central controller 908 controls protocol generator 922 to generate control commands according to the control information.

Before a data communication process starts, the four registers (910, 912, 914 and 916) at both calling and called sides are set in initial states.

To start a data communication process, central controller 908 at the calling side controls protocol generator 922, data generator 918 and data decoder 906, according to a specific setup at the calling side. Machine identification generator 920 at the calling side generates a pre-determined machine identification. Under the control of central controller 908, protocol generator 922 combines the machine identification into CNG command frame and provides the CNG command frame to RS 232C serial port (808 or 812 shown in FIG. 7).

After the communication process has been started, central controller 908 at both the calling and called sides controls protocol generator 922, data generator 918 and data decoder 906, according to the negotiation information stored in the four registers (910, 912, 914 and 916).

In response to the negotiation information sent from the called side and stored in the four registers (910, 912, 914 and 916), central controller 908 at the calling side controls protocol generator 922 to generate desired protocol (or response protocol), data generator 918 to generate desired data in a normal operation mode, and data decoder 906 to decode data received in a polling operation mode.

In response to the negotiation information sent from the calling side and stored in the four registers (910, 912, 914 and 916), central controller 908 at the called side controls protocol generator 922 to generate desired response protocol; data generator 918 to generate desired data in a polling operation mode; and data decoder 906 to decode data received in a normal operation mode.

To deliver the protocol and image data, outputs 932 and 934 from protocol generator 932 and data generator 918, respectively, are coupled to RS 232C serial port (808 or 812 shown in FIG. 7). To display the received data, the output 936 of data decoder 906 is coupled to a printer (not shown).

FIGS. 9, 10A, 10B, 11A and 11B depict operation flow charts for the invention. While the calling machine having negotiation capability always transmits a negotiation capability identification to the called machine, it should be appreciated that facsimile machines with negotiation capability according to the invention are compatible with earlier facsimile machines without negotiation capability.

If calling and called machines each have negotiation capability, both machines will generate command frames containing negotiation capability information. As a result, the calling and called machine communicate with each other according to the negotiation capability information.

If the calling machine has negotiation capability and the called machine does not, the called machine will ignore the negotiations capability identification sent by the calling machine. Thus, the called machine cannot generate the command frames containing negotiation capability information. After realizing that the calling machine cannot acknowledge the negotiation capability identification, the calling machine will not generate negotiation information during the data communication process.

In the situation that the calling machine does not have negotiation capability and the called machine has capability, the called machine will not receive the negotiation capability identification from the calling machine. As a result, the called machine will not generate negotiation information during the data communication process.

Figure 9:
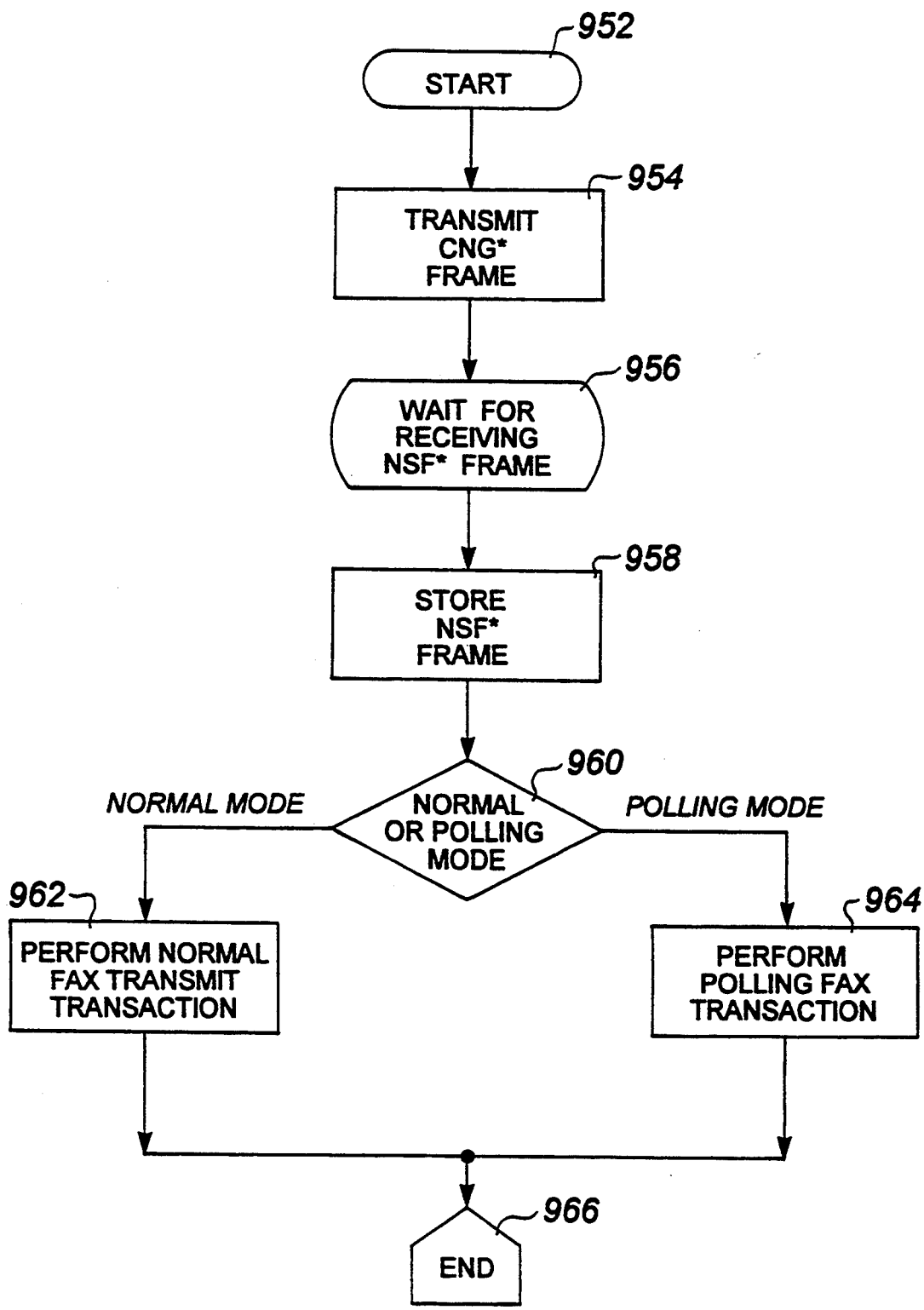
FIG. 9 depicts an operation flow chart for the facsimile machines shown in FIGS. 7 and 8, in accordance with the invention.

FIG. 9 depicts a flow chart of data communication operation for a calling and a called machines shown in FIGS. 7 and 8, in accordance with the invention. Step 952 starts the operation. Under the control of the central controller (908 in FIG. 8) and the machine identification generator (920 in FIG. 8), the calling machine (shown in FIG. 7) transmits a CNG* frame to a called machine (shown in FIG. 7) at step 954. At step 956, the calling machine waits for receiving an NSF* command frame sent by the called machine. The NSF* command frame contains the information indicating the capabilities of the called machine. At step 958, the called machine stores the received NSF* command frame in Register RNSF 912 (shown in FIG. 8). At step 960, the operation tests whether the calling machine is set in a normal operation mode or in a polling operation mode. It should be noted that central controller 908 (shown in FIG. 8) is responsible for setting the calling machine in a specific operation mode.

If step 960 determines that the calling machine is set in a normal mode, the operation leads to step 962, in which case the calling machine transmits fax data and the called machine receives the fax data. Step 962 is depicted in further detail in FIGS. 10A and 10B. If step 960 determines that the calling machine is set in a polling mode, the operation leads to step 964, in which case the called machine transmits fax data and the calling machine receives fax data. Step 964 is described in further detail in FIGS. 11A and 11B. After the fax data have been transmitted by a transmitting side and received by a receiving side, the operation terminates at step 966.

Figure 10A:
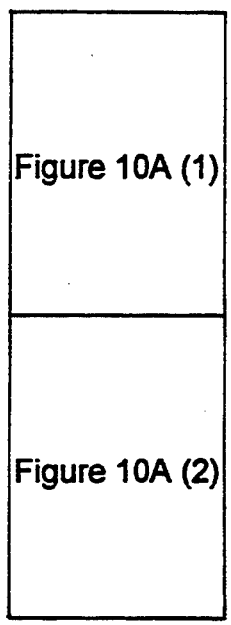
FIGS. 10A and 10B (10A-1, 10A-2, 10B-1, 10B-2) depict operation flow charts for a calling and a called facsimile machines in a normal mode, in accordance with the invention.

FIG. 10A depicts operation of a calling machine in a normal mode, in accordance with the invention. After the operation starts at step 1002, the calling machine transmits a CNG* command frame at step 1004. The CNG* frame includes a machine identification (MACID) (shown in FIG. 5A) that indicates whether the calling machine has negotiation capability. At step 1006, the calling machine waits to receive an NSF* frame sent by the called machine. The NSF* frame contains information (shown in FIG. 6) indicating the called machine's capabilities. After the NSF* frame (sent by the called machine) has been received by the receiver (902 in FIG. 8) of the calling machine, the calling machine also stores the NSF* frame in register RNSF (912 in FIG. 8) at step 1006. According to the called machine's capability information stored in RNSF, the calling machine transmits an NSS* frame to the called machine at step 1008. The NSS* frame sent by the calling machine contains information (shown in FIG. 6) indicating parameters for the forthcoming fax data.

At step 1010, the calling machine waits for receiving a CFR frame sent by the called machine. The reception of the CFR frame confirms that the called machine has successfully received the NSS* frame sent by the calling machine via the asynchronous digital network. At step 1012, the calling machine transmits a page of fax data to the called machine. At step 1014, the calling machine waits for receiving an EDT frame sent by the called machine. The reception of the EDT frame confirms that the page of fax data has indeed gone through the asynchronous digital network, and has been successfully received by the called machine. At step 1016, the operation for the calling machine tests whether the fax data page being transmitted is the last fax data page. The scanner (940 in FIG. 8) at the data transmitting side detects whether there are more pages of fax data, and provides the central controller (908 in FIG. 8) with the information as to whether there are more pages of fax data.

If step 1016 determines that the fax data page being transmitted is not the last fax data page, the operation for the calling machine leads to step 1018 to further test whether the parameters should be changed for the consequent page(s) of fax data. If step 1016 determines that the parameters should be not changed, the operation for the calling machine leads to step 1020 for the calling machine to transmit an MPS command frame. At step 1022, the calling machine waits to receive an MCF frame sent by the called machine. The operation for the calling machine then leads back to step 1012 for the calling machine to transmit a consequent page of fax data without changing the parameters.

But if step 1018 determines that the parameters should be changed, the operation for the calling machine leads to step 1024 for the calling machine to transmit an EOM frame. At step 1026, the calling machine waits to receive an MCF frame sent by the called machine. After receiving the MCF frame, the calling machine transmit a RQN frame at step 1028. The operation for the calling machine then leads to step 1006 to restart the negotiation process, setting new parameters for the subsequent page(s) of fax data.

Referring back to step 1016, if the operation for the calling machine determines that the fax data page being transmitted is the last fax data page, the operation for the calling machine leads to step 1030 for the calling machine to send out an EOP frame. At step 1032, the calling machine waits to receive an MCF frame sent by the called machine. After the MCF frame has been received at step 1032, the calling machine transmits a DCN command frame, indicating disconnection of the calling machine. The operation for the calling machine then terminates at step 1036.

Figure 10B:
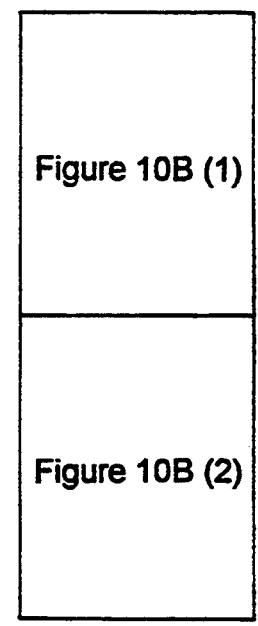

FIG. 10B depicts operation for a called machine in a normal mode, in accordance with the invention. Under control of its central controller (908 shown in FIG. 8), the called machine receives the CNG* frame sent by the calling machine and stores the CNG* frame in register RCNG (910 in FIG. 8) at step 2002. At step 2004, the operation for the called machine tests whether the machine identification (ID) contained in the CNG* frame is "2". If step 2004 determines that the machine ID is not "2" (indicating that the calling machine does not have negotiation capability), the operation for the called machine leads to step 2008 for the called machine to transmit an NSF frame that does not contain negotiation information. But if step 2004 determines that the machine ID is "2" (indicating that the calling machine has negotiation capability), the operation for the called machine leads to step 2006 for the called machine to transmit an NSF* frame that contains the information to indicate the capabilities of the called machine. The called machine then waits to receive an NSS* frame sent by the calling machine. The NSS* frame contains the information (shown in FIG. 6) to indicate the parameters for the forthcoming fax data sent by the calling machine.

After the NSS* frame (sent by the calling machine) has been received by the receiver (902 in FIG. 8) of the called machine, the called machine stores the NSS* frame in register RNSS (914 in FIG. 8) at step 2010. The called machine then transmits a CFR frame to the calling machine to confirm reception of the NSS* frame at step 2012, and receives a page of fax data at step 2014. To confirm successful reception of the page of fax data and the detection of the RTC sequence embedded in the page of fax data, the called machine transmits an EDT frame at step 2016. At step 2017, the called machine waits to receive a response from the calling machine. At step 2018, the operation for the called machine tests whether the received response from the calling machine is an MPS, an EOP or an EOM frame.

If step 2018 determines that the received response is an MPS frame, the called machine transmits an MCF frame to the calling machine, confirming reception of post message at step 2020. The operation for the called machine then leads back to step 2014 for the called machine to receive subsequent page(s) of fax data. It should be noted that if the received response is an MPS frame, the calling machine will use the same parameters for the subsequent page(s) of fax data. Thus, there is no need to change parameters for the consequent page(s) of fax data.

If step 2018 determines that the received response is an EOM frame, the operation for the called machine leads to step 2022 for the called machine to transmit an MCF frame to the calling machine, confirming the reception of the post message. At step 2024 the called machine waits to receive a RQN frame from the calling machine, and at step 2006 the called machine transmits an NSF frame to the calling machine. The operation for the called machine then leads back to step 2010 for the called machine to wait to receive an NSS* frame from the calling machine. It should be noted that if the received response is an EOM frame, the calling machine will use different parameters for the consequent page(s) of fax data. Thus, there is a need to change parameters for the consequent (page(s) of fax data.

If step 2018 determines that the received response is an EOP frame, the operation for the called machine leads to step 2026 for the called machine to transmit an MCF frame to the calling machine, confirming the reception of the post message. At step 2028 the called machine waits to receive a DCN frame from the calling machine. Upon receipt of the DCN frame, the operation for the called machine terminates at step 2030.

Figure 11A:
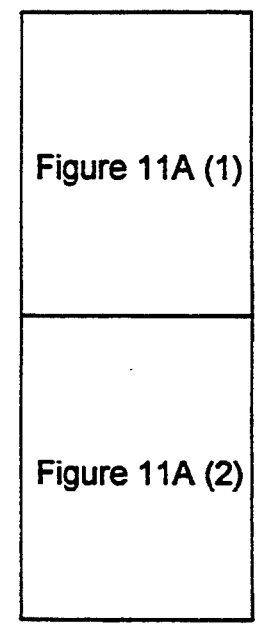
FIGS. 11A and 11B (11A-1, 11A-2, 11B-1, 11B-2) depict operation flow charts for a calling and a called facsimile machines in a polling mode, in accordance with the invention.

FIGS. 11A depicts the operation of a calling machine in a polling mode, in accordance with the invention. After the operation has been started at step 3002, the calling machine transmits an CNG* command frame at step 3004. At step 3006, the calling machine waits to receive an NSF* frame sent by the called machine. The called machine confirms the polling operation mode by setting the 6th bit of the FIF field in the NSF* frame to "1." After the NSF* frame (sent by the called machine) has been received by the receiver (902 in FIG. 8) of the calling machine, the calling machine transmits an NSC* frame to the called machine at step 3008, if the calling machine is set for polling. The NSC* frame sent by the calling machine contains information (shown in FIG. 6) to indicate the capabilities of the calling machine.

At step 3010, the calling machine waits to receive an NSS* sent by the called machine. The NSS* frame sent by the calling machine contains information (shown in FIG. 6) to indicate parameters for the forthcoming fax data. After the NSS* frame (sent by the called machine) has been received by the receiver (902 in FIG. 8) of the calling machine, the calling machine stores the NSS* frame in register RNSS (914 in FIG. 8) at step 3010. The calling machine then transmits a CFR frame to the called machine to conform the reception of the NSS* frame at step 3012, and receives a page of fax data at step 3014. To confirm successful reception of the page of fax data and the detection of the RTC sequence embedded in the page of fax data, the calling machine transmits an EDT frame at step 3016. At step 3017, the calling machine waits to receive a confirming response from the called machine. At step 3018, the operation for the calling machine tests whether the received response from the called machine is an MPS, an EOP or an EOM frame.

If step 3018 determines that the received response is an MPS frame, the calling machine transmits an MCF frame to the called machine, confirming the reception of the post message at step 3020. The operation for the calling machine then leads back to step 3014 for the calling machine then leads back to step 3014 for the calling machine to receive subsequent page(s) of fax data. It should be noted that if the received response is an MPS frame, the called machine will use the same parameters for the subsequent page(s) of fax data. Thus, there is no need to change parameters for the consequent page(s) of fax data.

If step 3018 determines that the received response is an EOM frame, the operation for the calling machine leads to step 3024 for the calling machine to transmit an MCF frame to the called machine, confirming the reception of the post message. At step 3026 the calling machine waits to receive a RQN frame from the called machine, and at step 3022 the calling machine transmits an NSF* frame to the called machine. The operation for the calling machine then leads back to step 3010 for the calling machine to wait to receive an NSS* frame from the called machine to wait to receive an NSS* frame from the called machine. It should be noted that if the received response is an EOM frame, the called machine will use different parameters for the consequent page(s) of fax data. Thus, there is a need to change parameters for the consequent page(s) of fax data.

If step 3018 determines that the received response is an EOP frame, the operation for the calling machine leads to step 3028 for the calling machine to transmit an MCF frame to the called machine, confirming the reception of the post message. At step 3030 the calling machine waits to receive a DCN frame from the called machine. Upon receiving the DCN frame, the operation for the calling machine terminates at step 3032.

Figure 11B:
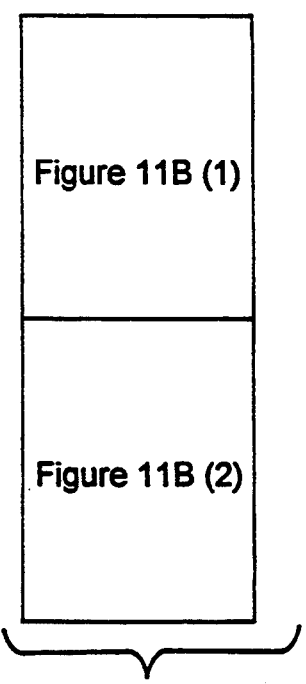
Figures 1, 10A:
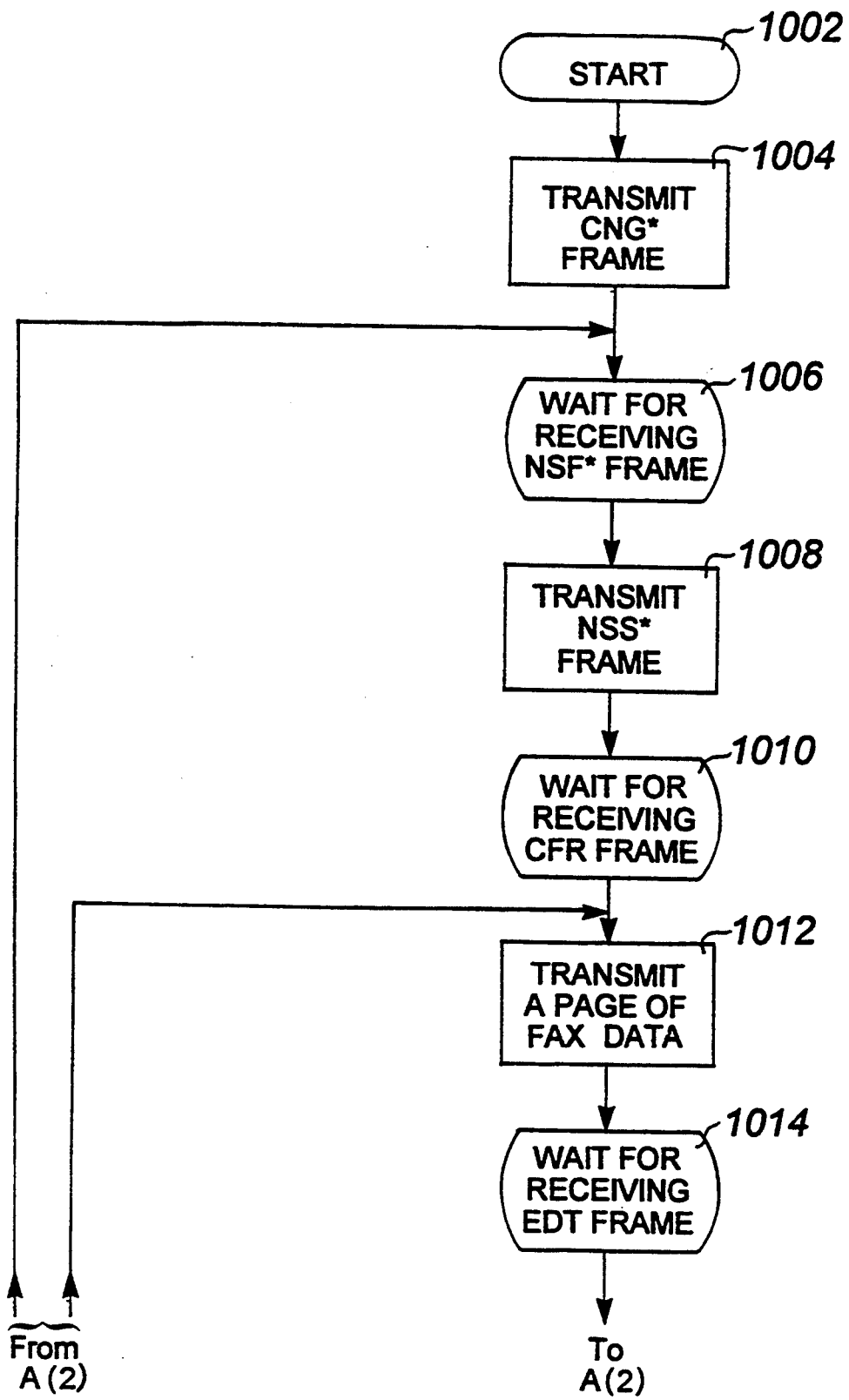
Figures 2, 10A:
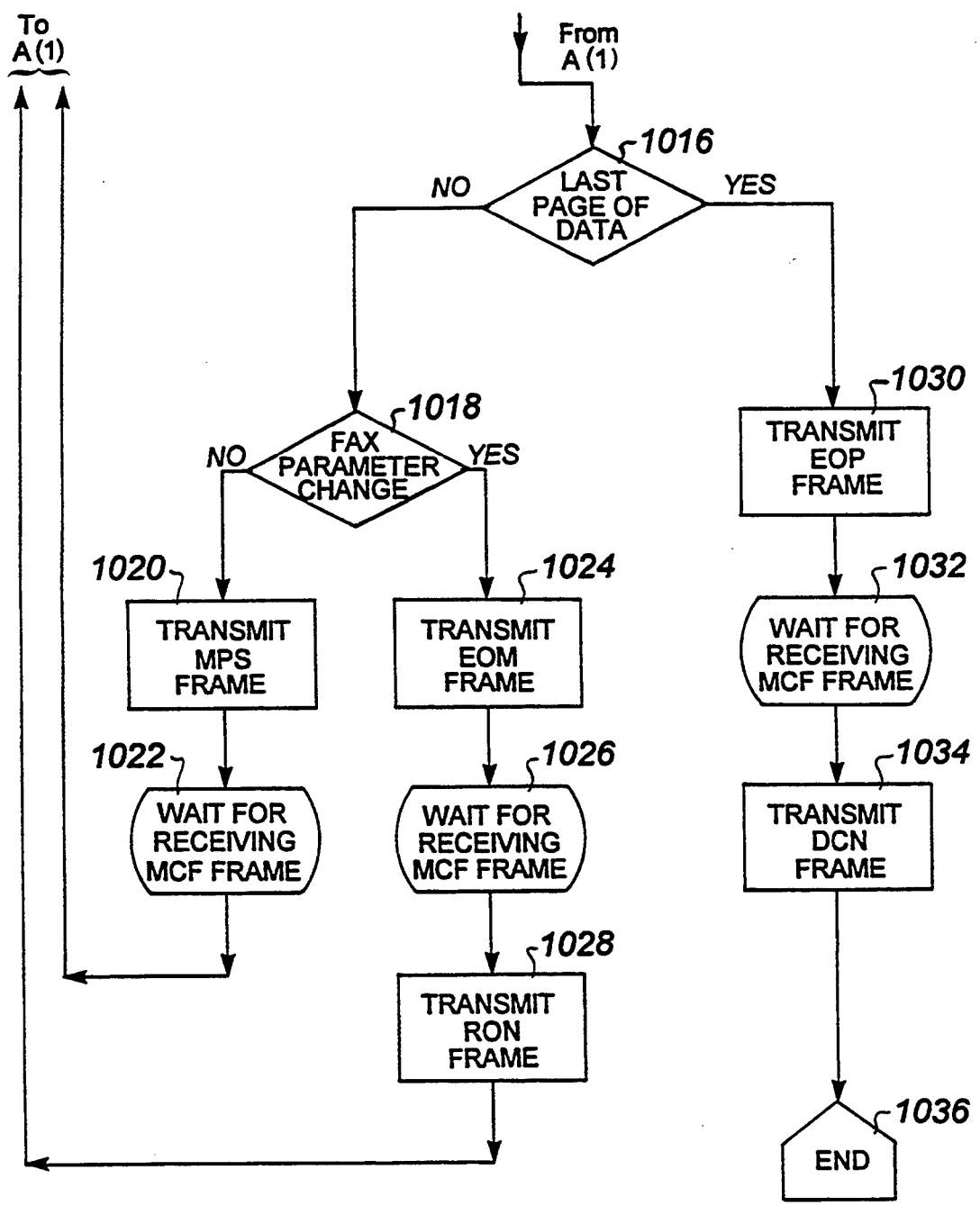
Figures 1, 10B:
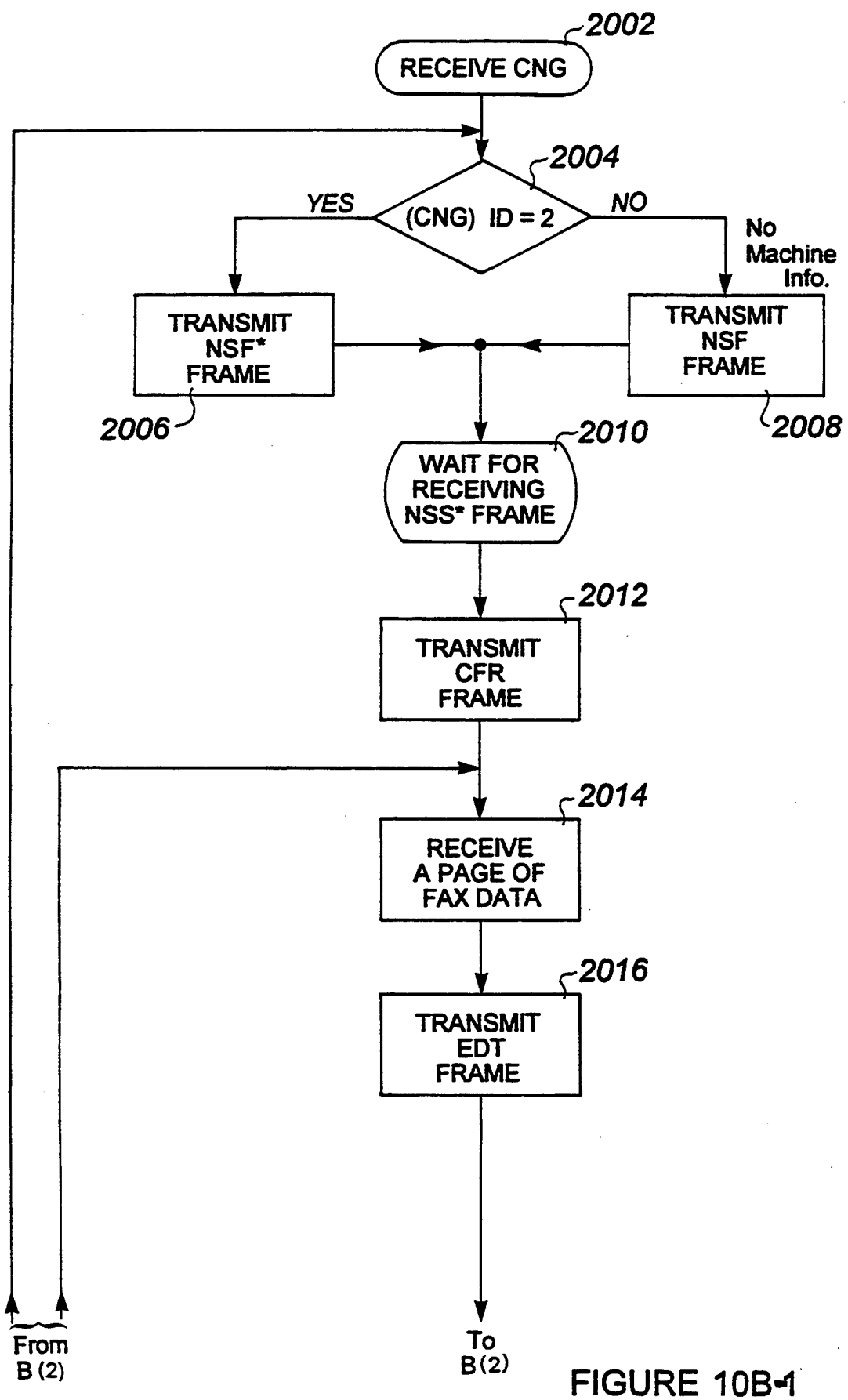
Figures 2, 10B:
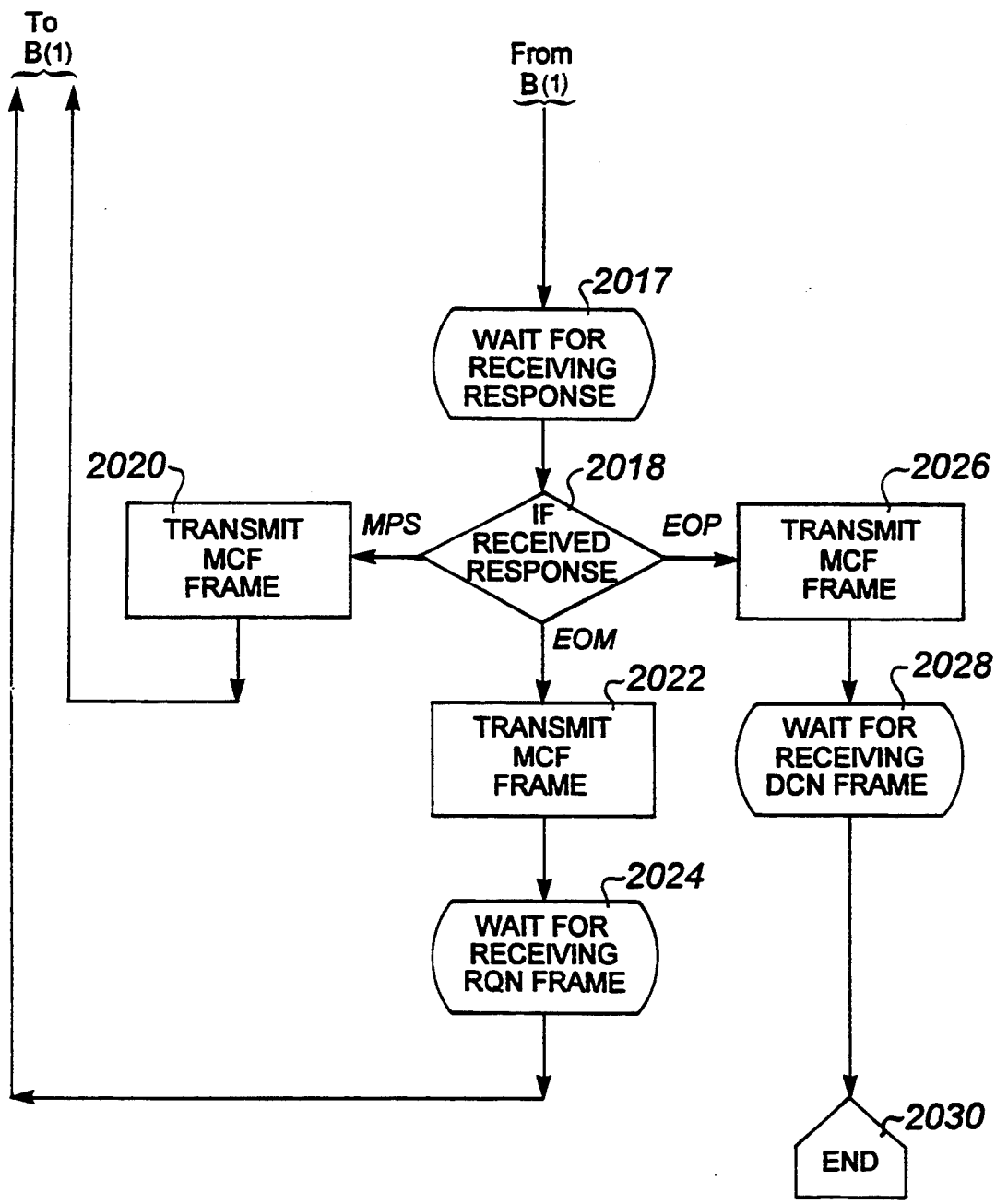
Figures 1, 11A:
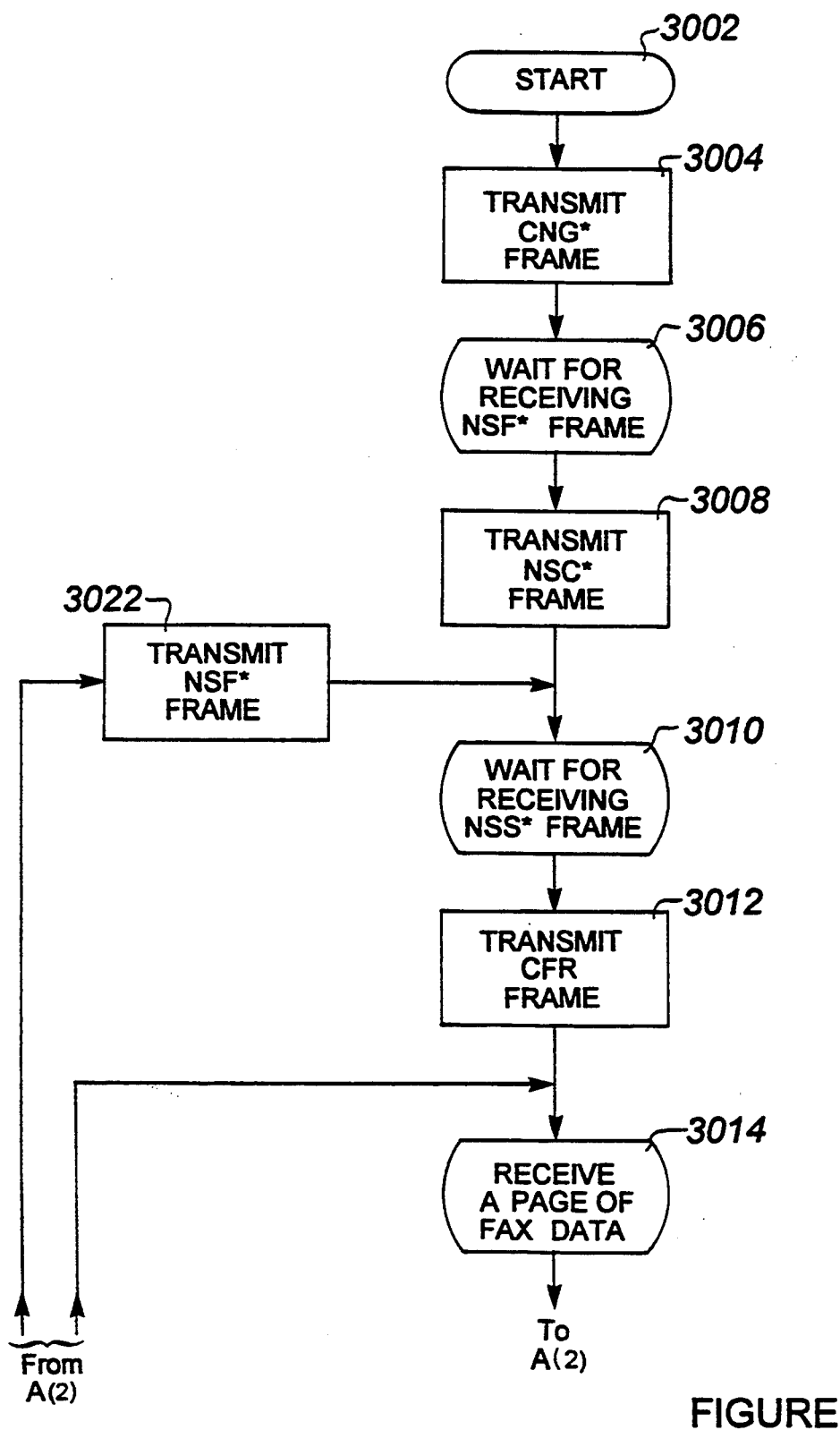
Figures 2, 11A:
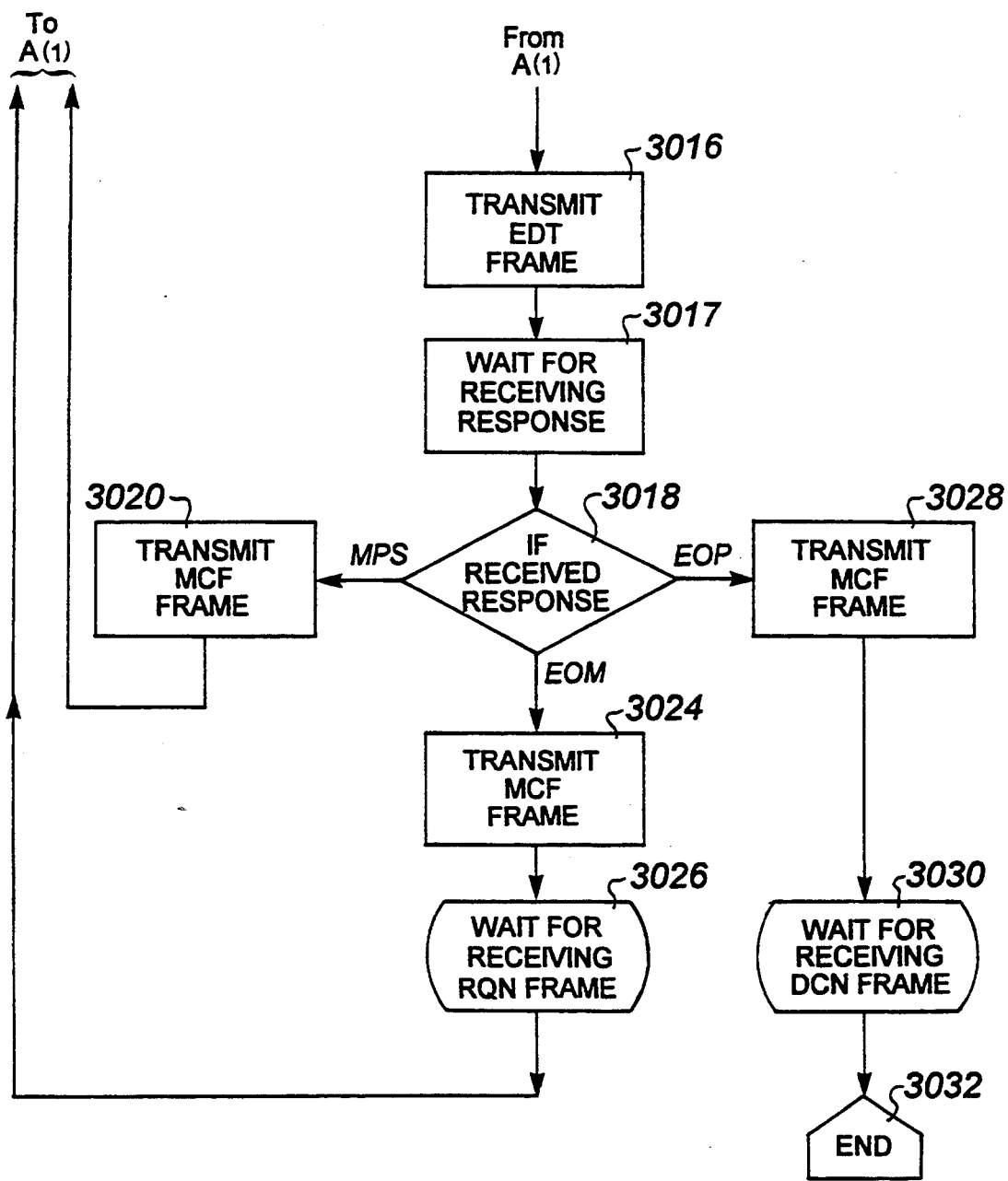
Figures 1, 11B:
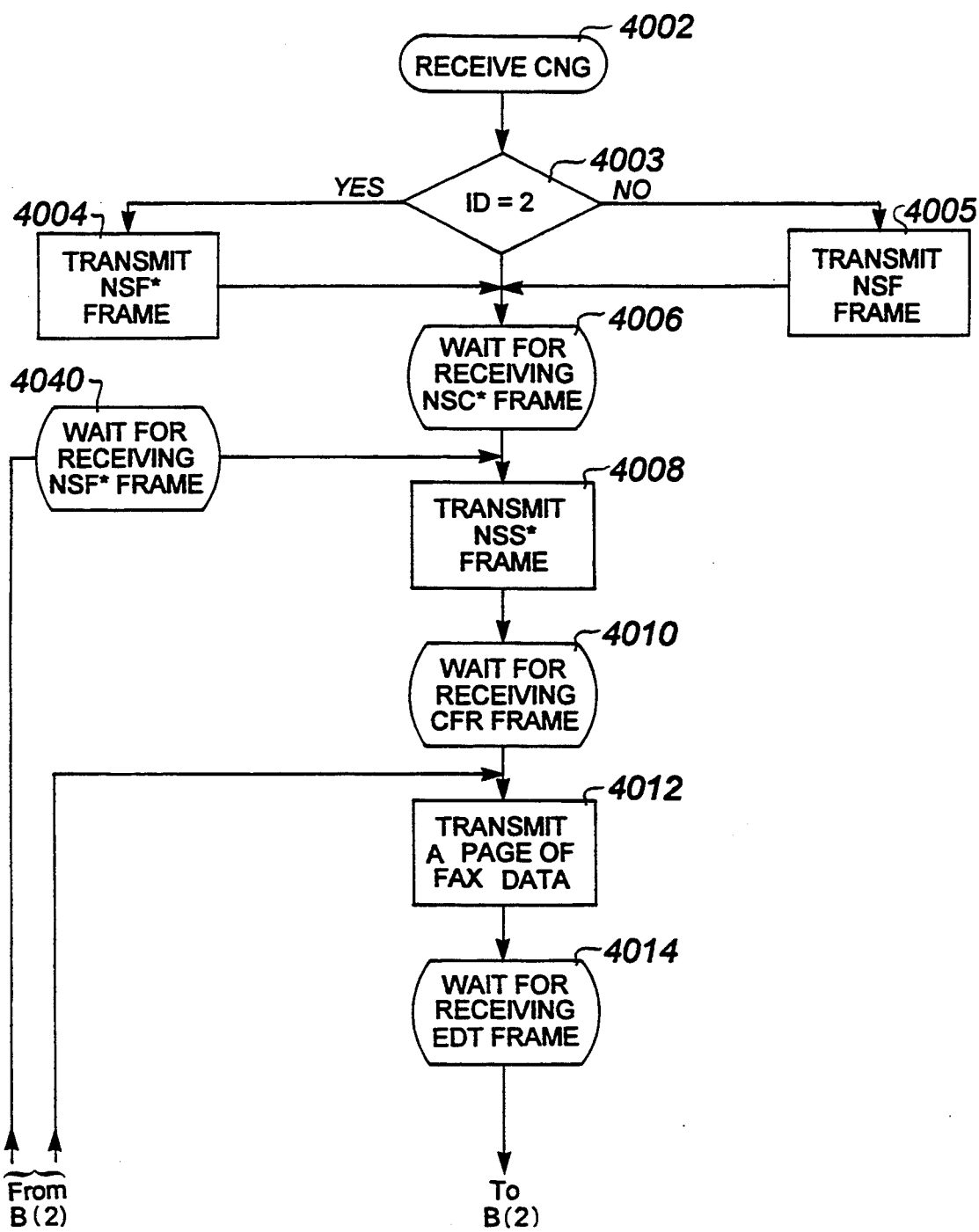
Figures 2, 11B:
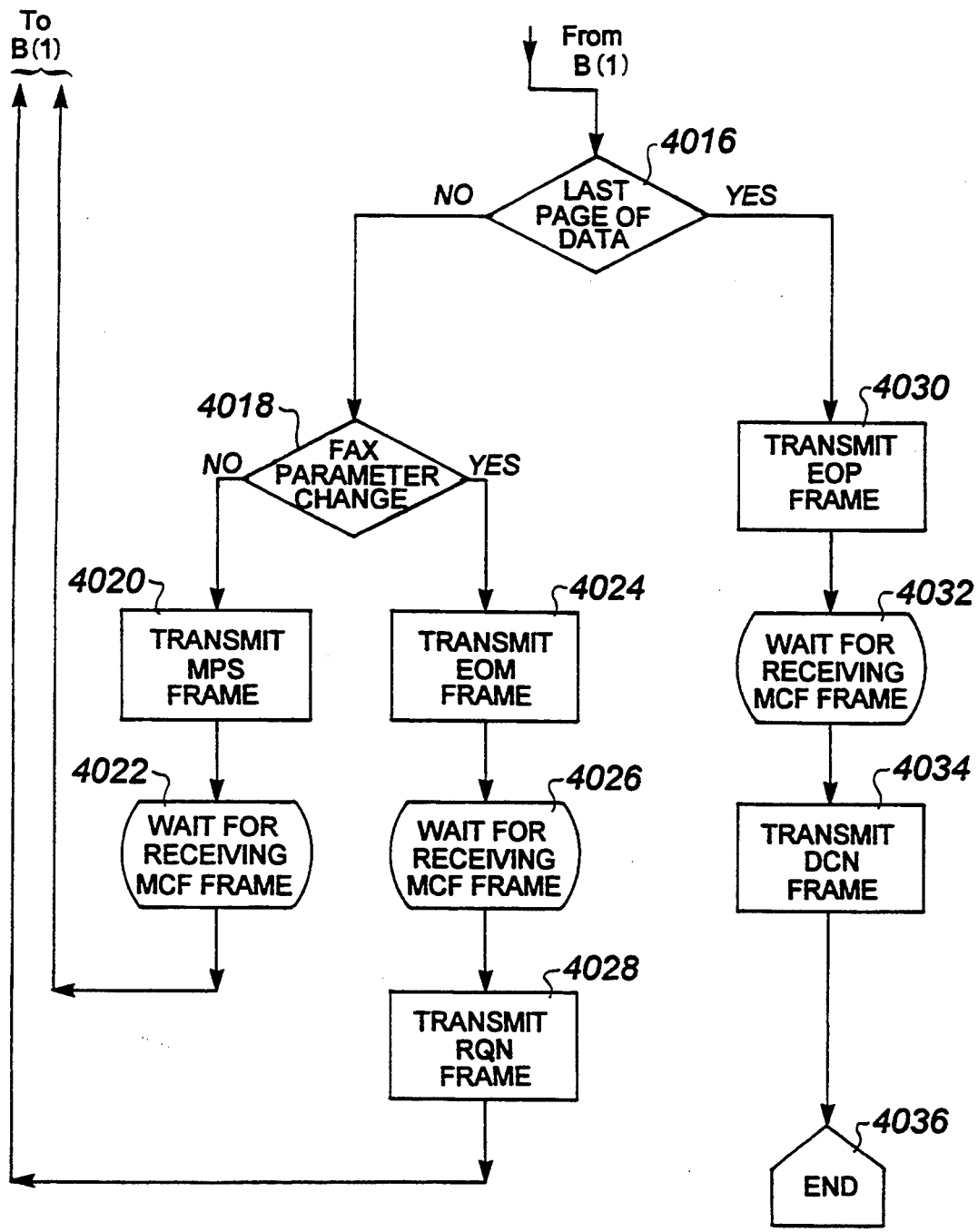

FIGS. 11B depicts the operation of a called machine in a polling mode, in accordance with the invention. After the called machine receives the CNG* command frame and stores the CNG* command frame in register RCNG 910 (in FIG. 8) at step 4002, the operation tests whether the machine negotiation capability identification (ID) is "2" at step 4003. If the ID is "2", the called machine transmits an NSF* command frame containing negotiation information at step 4004. The called machine also confirms the polling operation mode by setting the 6th bit of the FIF field in the NSF* command frame to "1". If the ID is not "2", the called machine transmits an NSF command frame without containing negotiation information at step 4005.

At step 4006, the called machine waits to receive an NSC* frame sent by the calling machine. The NSC* frame contains information (shown in FIG. 6) to indicate the capabilities of the calling machine. After the NSC* frame (sent by the calling machine) has been received by the receiver (902 in FIG. 8) of the called machine, the called machine stores the NSC* frame in register RNSC (916 in FIG. 8) at step 4006. According to the calling machine's capability information stored in RNSC, the called machine transmits an NSS* frame to the calling machine at step 4008. The NSS* frame sent by the called machine contains information (shown in FIG. 6) to indicate parameters for the forthcoming fax data. At step 4010, the called machine waits to receive a CFR frame sent by the calling machine. The reception of the CFR frame confirms that the calling machine has successfully received the NSS* frame sent by the called machine via the asynchronous digital network. At step 4012, the called machine transmits a page of fax data to the calling machine. At step 4014, the called machine waits to receive an EDT frame sent by the calling machine. The reception of the EDT frame confirms that the page of fax data has indeed gone through the asynchronous digital network, and has been successfully received by the calling machine. At step 4016, the operation for the called machine tests whether the fax data page being transmitted is the last fax data page.

If step 4016 determines that the fax data page being transmitted is not the last fax data page, the operation for the called machine leads to step 4018 to further test whether the parameters should be changed for the subsequent page(s) of fax data. If step 4016 determines that the parameters should be not changed, the operation for the calling machine leads to step 4020 for the called machine to transmit an MPS frame. At step 4022, the called machine waits to receive an MCF frame sent by the calling machine. The operation for the called machine then leads back to step 4012 to transmit subsequent page(s) of fax data.

If step 4018 determines that the parameters should be changed, the operation for the called machine leads to step 4024 for the called machine to transmit an EOM frame. At step 4026, the called machine waits to receive an MCF frame sent by the calling machine. After receiving the MCF frame, the called machine transmit a RQN frame at step 4028. At step 4040, the called machine waits to receive an NSF* frame from the calling machine. Upon receiving the NSF* frame, the operation for the called machine leads back to step 4008 for the calling machine to transmit an NSS* frame to set new parameters for subsequent page(s) of fax data.

Referring back to step 4016, if the operation for the called machine determines that the fax data page being transmitted is the last fax data page, the operation for the called machine leads to step 4030 for the called machine to send out an EOP frame. At step 4032, the called machine waits to receive an MCF frame sent by the calling machine. After the MCF frame has been received, the calling machine transmits a DCN frame at step 4034, indicating disconnection of the calling machine. The operation for the called machine then terminates at step 4036.

C. Error Correction Method (ECM) Protocol and Associated Facsimile Machine

To add error correction method ECM capability to the IDI protocol, the present invention utilizes the half-duplex page selective repeat automatic repeat request (ARQ) technique. The asynchronous ECM is similar to the CCITT standard. In addition, an HDLC frame structure is utilized for all binary coded facsimile message procedures.

The transmitting station divides the coded data into a number of frames and transmits them with each frame number. When the previous message has not satisfactorily been received, the receiving station transmits a PPR response to indicate that the frames specified in the associated facsimile information field are required to be retransmitted. When PPR is received, the transmitting station retransmits the requested frames specified in the PPR information field. In a preferred embodiment, when PPR is received four times for the same block of data, either the EOR command is transmitted or CTC command is sent for continuous retransmission.

Figure 12:
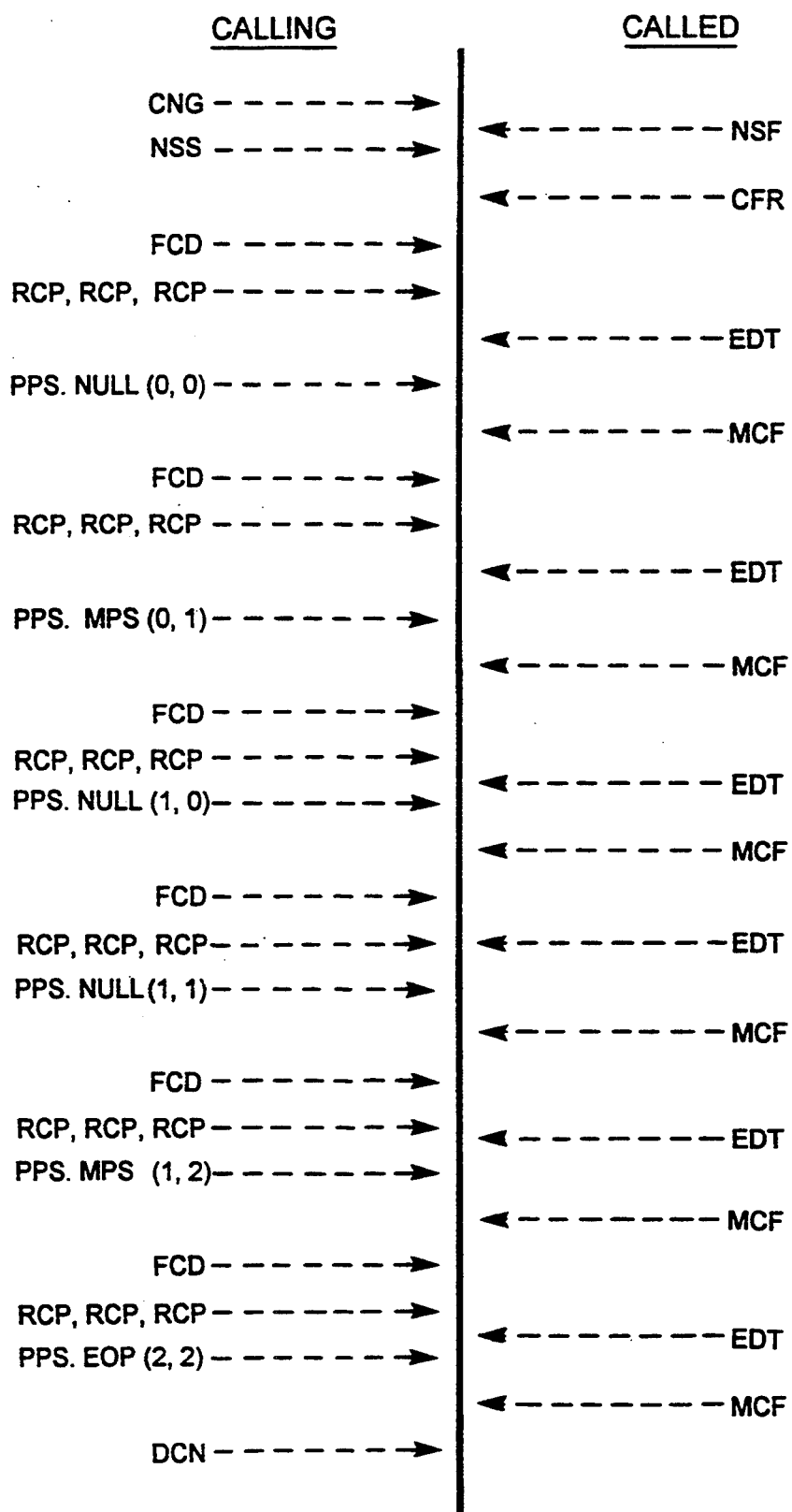
FIG. 12 depicts several data communication situations for transmission over an asychronous digital data network in accordance with the present invention.

The protocol is illustrated in FIG. 12, which depicts a typical multi-page fax data communication process, without errors. The exchange of handshake protocol transmitting and receiving negotiation information (CNG, NSF, NSS, and CFR) initiates the transmission of data between the calling machine and the called machine. In the illustrated normal mode of FIG. 12, the calling machine is the machine transmitting data to the called machine.

As in the embodiment described above, the modified CNG carries machine identification information, which the called machine decodes. The decoded information is used by the called machine to identify the calling machine as a machine capable of performing ECM operation. The called machine responds with the Non-Standard Facilities (NSF) frame and includes its own ECM capability in the extended NSF frame. The calling machine decodes the received NSF frame and initiates an ECM operation by transmitting the Non-Standard Facilities Set-Up (NSS) frame.

Figure 13A:
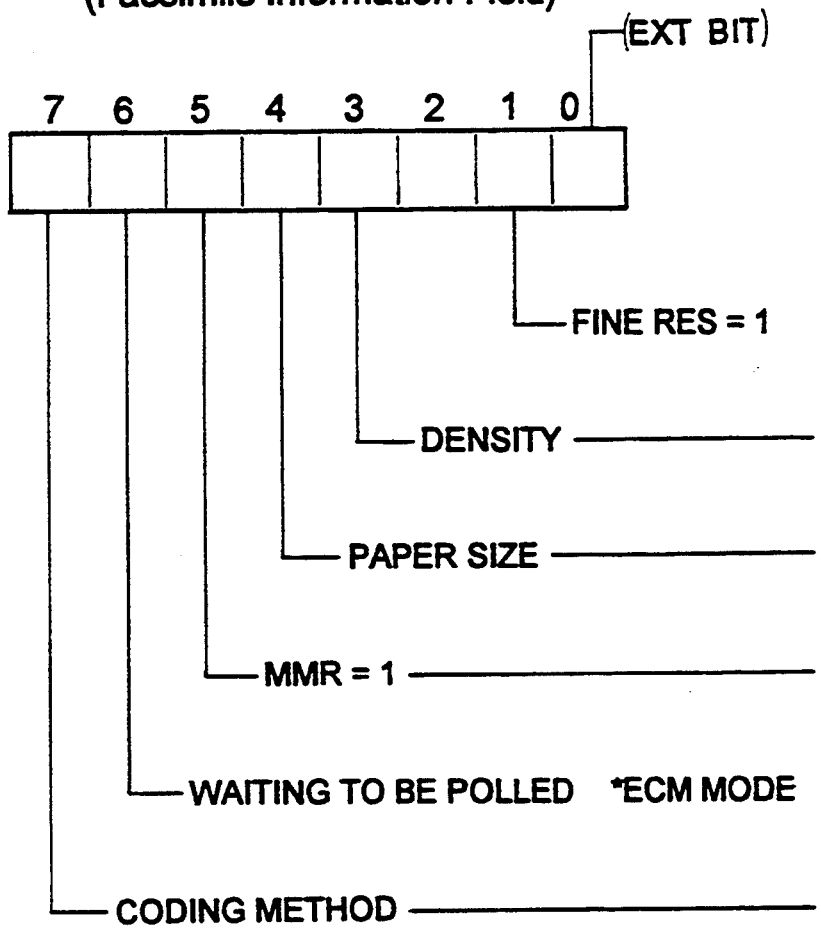
FIGS. 13A and 13B depict the content of a facsimile information field (FIF) of the present invention.
Figure 13B:
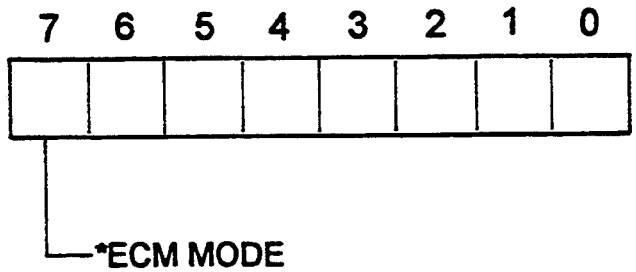

FIGS. 13A and 13B depict a facsimile information field (FIF) of a system incorporating the present invention, including the ECM capability. As illustrated in FIG. 13A, a setting of 1 at the 6th bit indicates ECM mode for the NSS command frame. A setting of 1 at the 0th bit indicates that an extended byte (extra) of facsimile information field (FIF) exists. As depicted in FIG. 13B, a setting of 1 at the 7th bit of the extended FIF byte indicates ECM mode for the NSF & NSC command frames. The other bits of the extended FIF byte are unused and are reserved for further enhancements.

The called machine decodes the NSS frame and accordingly gears itself to receive ECM facsimile image data. The called machine transmits a Confirmation to receive (CFR) frame acknowledging receipt of the NSS frame. The calling machine then starts to transmit fax data page in the ECM frame format and appends the Return to Control of Partial Page (RCP) frame. The called machine on detecting the RCP, sends End of Page Detect (EDT) frame. In response to receipt of the EDT frame, the calling machine sends Partial Page Signal (PPS) indicating whether the current transaction was a partial page, last page, or non-last page. If the called machine receives the transmitted image data without any errors, the called machine transmits Message Confirmation Signal (MCF) and the calling machine either continues to the next page or ends the transaction with a Disconnect Message (DCN).

Figure 14:
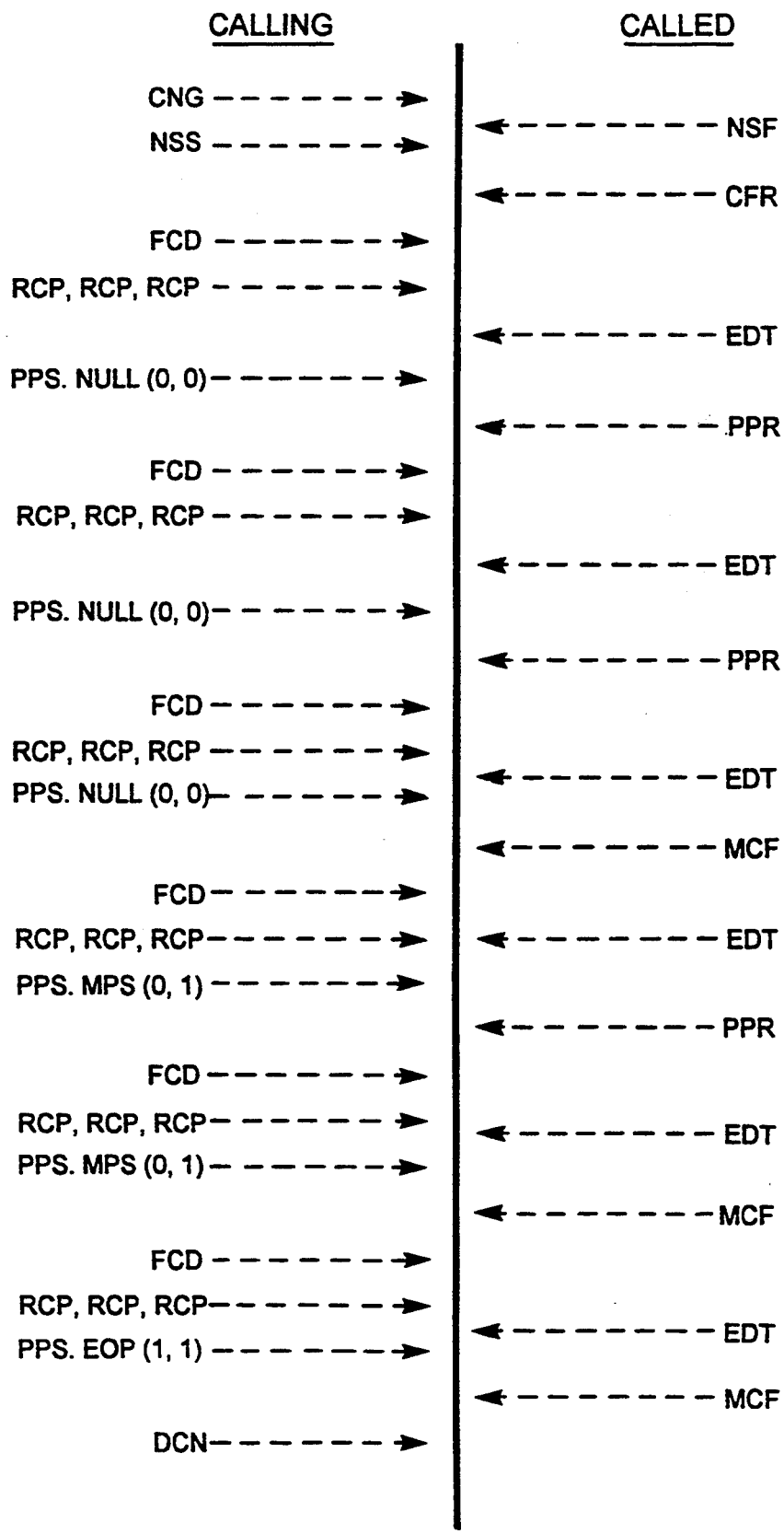
FIG. 14 depicts several data communication situations for a transmission over an asynchronous digital data network, including errors in the transmission, in accordance with the present invention.

FIG. 14 depicts a situation in which errors occur during transmission of data. As illustrated, if the facsimile transmission received by the called machine contains errors, then the called machine transmits Partial Page Request (PPR) command indicating which frames of data to re-transmit. In response to receiving the PPR command, the calling machine transmits the requested frame. In FIG. 14, an error occurred three times, as evidenced by the occurrence of a PPR command at three instances.

Figure 15:
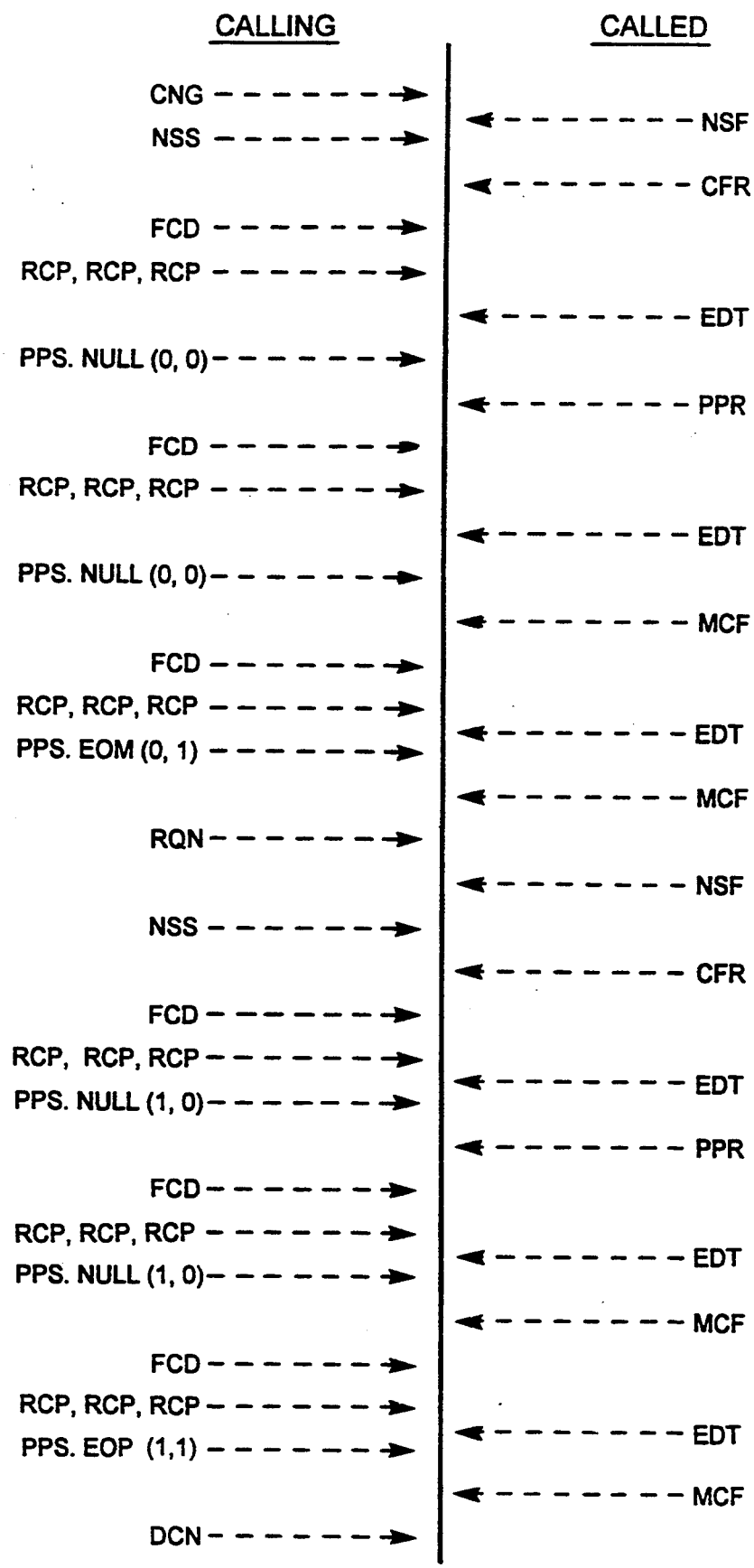
FIG. 15 depicts several data communication situations for transmission, with parameter change, over an asynchronous digital data network in accordance with the present invention.

If the transmission of data involves transmitting a multiple page document with a change in parameters, such as resolution, in an ECM protocol, the calling machine transmits a Request Next Command (RQN) frame, as shown in FIG. 15. The RQN frame is transmitted by the calling machine after that machine receives an MCF frame from the called machine. Responsive to receiving an RQN frame, the called machine response with a new NSF frame, and transmission continues. In the illustrated example, the transmission also includes errors, as evidenced by the presence of PPR frames.

In a polling mode, as in the embodiment described above, the calling machine behaves as a called machine, and the called machine behaves as a calling machine. The calling machine "wakes up" the called machine with the CNG command frame. The called machine responds with the NSF frame, indicating ECM capability and the desire to be polled. The calling machine responds with the extended NSC command, indicating ECM capability to the called machine. Next, the called machine switches its role to a transmitter and transmits the NSS command directing the called machine, now prepared to function as a receiver. After this point, the transmission continues as for normal operating mode described above.

Figure 17:
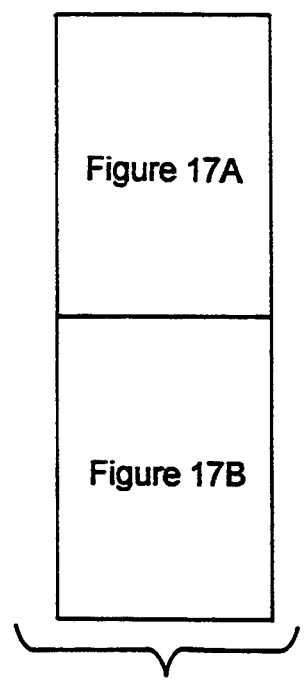
FIG. 17 (17A and 17B) depicts an operation flow chart for a calling, or transmitting, facsimile machine embodying the present invention having ECM capabilities.
Figure 16:
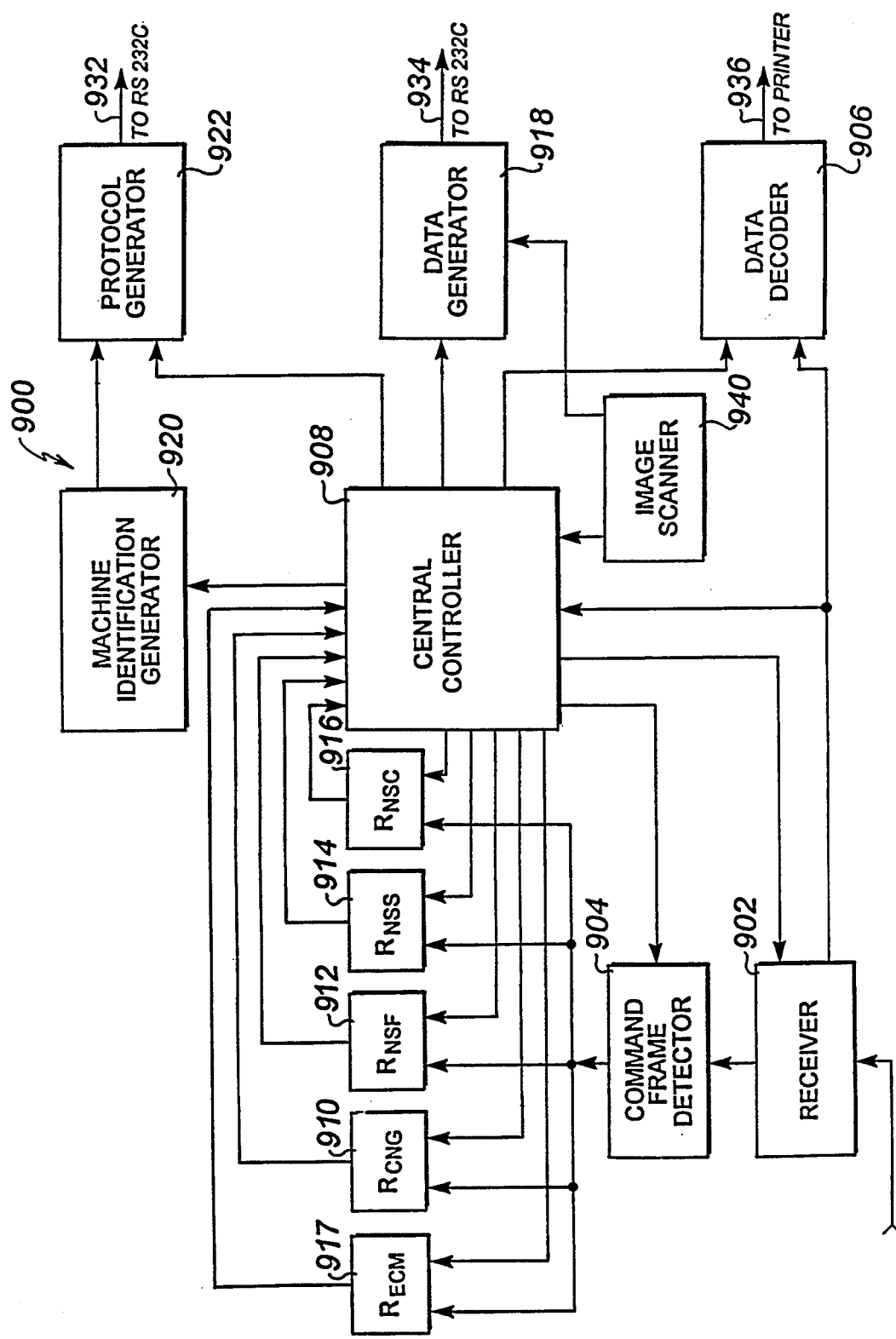
FIG. 16 depicts a block diagram of the control circuitry (806 or 814) shown in FIG. 7 in accordance with the present invention.
Figure 17A:
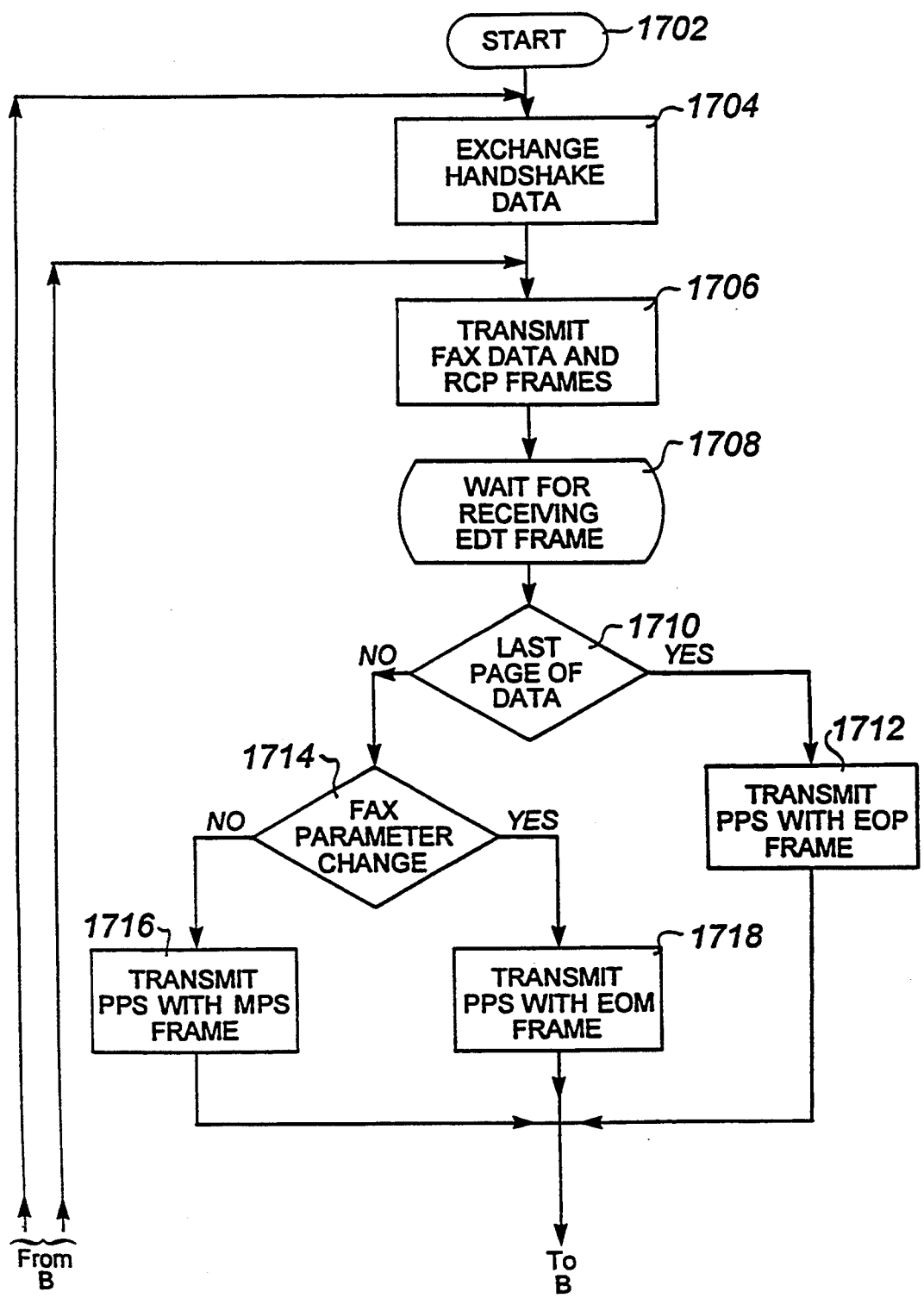
Figure 17B:
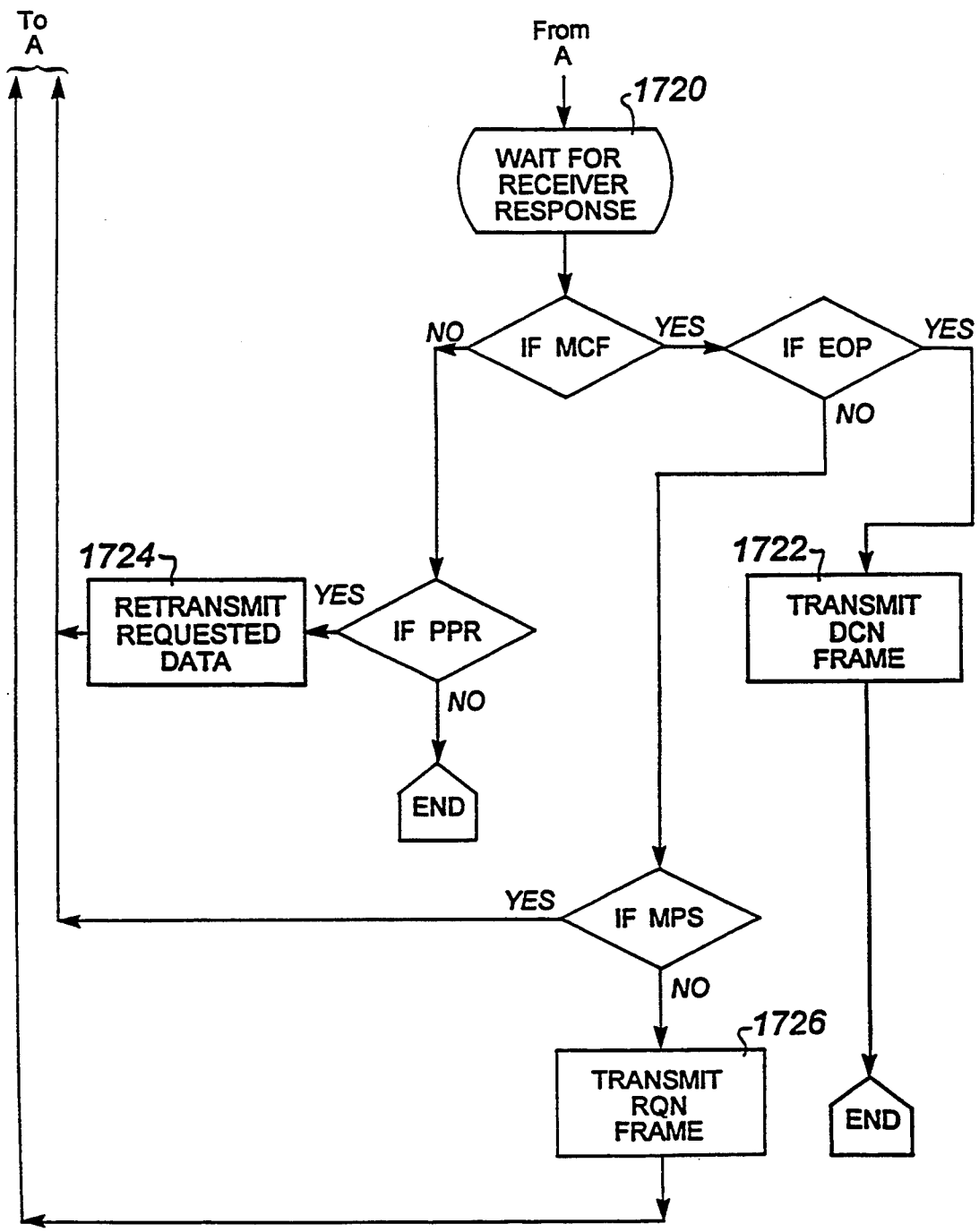
Figure 18A:
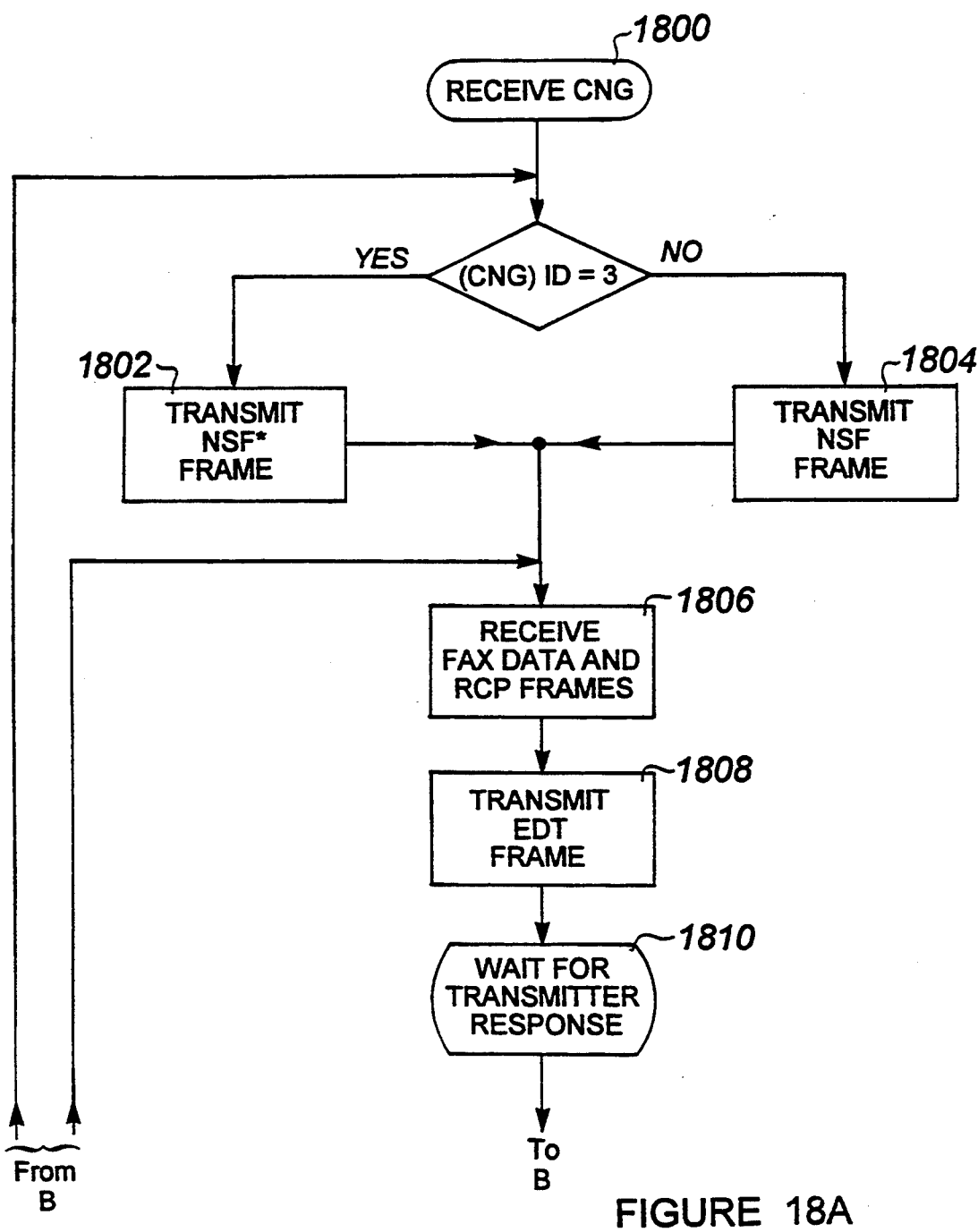
Figure 18B:
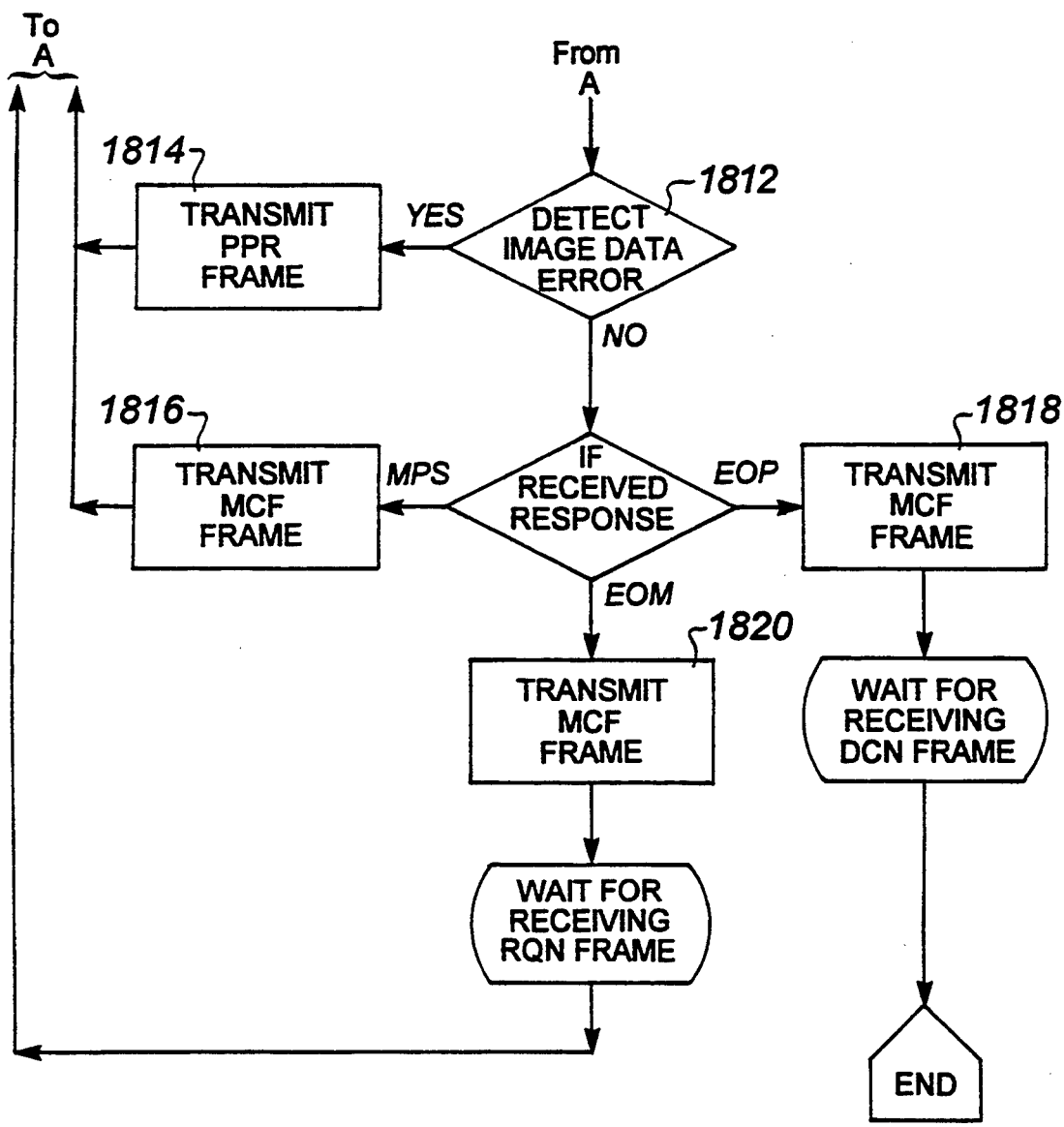

Turning now to FIG. 16, that figure depicts control circuitry (806 or 814 of FIG. 7) incorporating the ECM capability. In the illustrated embodiment, the control circuitry includes all of the components illustrated and described with respect to FIG. 8. In addition, the circuitry includes an additional register, RECM 917. Turning now to FIG. 17, an operation flow chart for a calling machine embodying the present invention including ECM capabilities is described. Once the operation is started 1702 the system exchanges 1704 handshake negotiation data to establish the ECM capabilities of the respective machines. A page of image data begins to be transmitted 1706, either in a normal or a polling mode. At step 1708 the calling machine waits for receipt of an EDT frame sent by the called machine.

Once the EDT frame is received by the calling machine, the system next queries 1710 whether the page of data transmitted was the last page of data and proceeds to transmit 1712 a PPS with an EOP frame if true. If the page of data being transmitted was not the last page, the next step 1714 is a check for any parameter changes that may have occurred mid-transaction. If there are no parameter changes, a PPS is transmitted 1716 with an MPS frame. If parameter changes did occur, a PPS is transmitted 1718 with an EOM frame.

Following transmission of data, the system waits 1720 for a response from the receiving machine. If a message confirmation MCF is received and an EOP was transmitted 1712, the machine transmits 1722 a DCN frame indicating disconnect. If a message confirmation MCF is received and EOP was not transmitted, the system further queries whether a PPR command was received from the called machine, indicating which frames of data to re-transmit. If a PPR was received, then the requested frames of data are retransmitted 1724. If a MCF is received, an EOP is not received, and no MPS is received, a request next command RQN frame is transmitted 1726. The system cycles through each of the steps described above until the transaction is completed.

Figure 18:
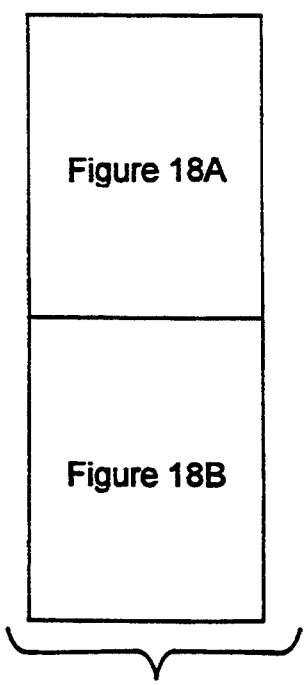
FIG. 18 (18A and 18B) depicts an operation flow chart for a called, or receiving, facsimile machine embodying the present invention having ECM capabilities.

Turning now to FIG. 18, that figure shows a block diagram for the called, or receiving, machine embodying the present invention. In that illustrated embodiment, a transaction begins upon receipt 1800 of a CNG frame from a calling machine. If the machine identification is "3", indicating that the calling machine has not only negotiation capability but also has ECM capability, an NSF frame including ECM capability information is transmitted 1802 to the calling machine. Otherwise, an NSF frame without ECM capability indication is transmitted 1804 to the calling machine.

Following these initial steps, the called machine begins receiving 1806 facsimile data and RCP frames from the calling machine. Upon receipt 1806 of the frame data, the called machine transmits 1808 an EDT frame confirming receipt of the frame data. The system then waits 1810 for a response from the calling machine. If an image data error is detected 1812, the called machine transmits 1814 a PPR frame and then waits to receive 1806 the retransmitted data. If an image data error is not detected and a response is received 1816 from the calling machine including an MPS frame, indicating no change in parameters, the system transmits 1816 an MCF frame then waits to receive 1806 the transmitted. If an EOP frame is received, the system transmits 1818 an MCF frame then waits 1820 to receive a DCN frame. If an EOM frame is received indicating change of parameters, the system transmits 1820 an MCF frame then waits 1822 to receive an RQN frame before returning to the beginning of the cycle.

While one particular embodiment of the invention has been described in detail, it will be understood that the invention may be implemented through alternative embodiments. Thus, the scope of the invention is not intended to be limited to the embodiments described above, but is to be defined by the appended claims.

What is claimed is:

1. A method for operating a communication system, including a calling apparatus and a called apparatus, for transmitting data therebetween over an asynchronous digital network during a transmitting process in accordance with a protocol standard, wherein the calling apparatus and the called apparatus generate a plurality of command frames and at least one data frame during the transmitting process, the method comprising the sequential steps of:

(a) exchanging, between the calling apparatus and the called apparatus, a plurality of preliminary command frames representative of handshake protocol information including error correction method ECM capabilities;
  (b) initiating an error correcting operation;
  (c) transmitting a data set, including at least one data frame having associated data frame identification information, between the calling apparatus and the called apparatus; and
  (d) verifying receipt of the data set.

2. The method of claim 1, wherein the exchanging step further comprises:

(i) transmitting a first command frame, including data representative of calling apparatus identification information, and a second command frame, including data representative of error correction method ECM information, from the calling apparatus to the called apparatus; and
  (ii) transmitting a third command frame, including data representative of called apparatus identification information, and a fourth command frame, including data representative of error correction method ECM information, from the called apparatus to the calling apparatus.

3. The method of claim 1, wherein the verifying step further comprises transmitting, from the called apparatus to the calling apparatus, a command frame representative of end of page detect EDT including an end of page query.

4. The method of claim 1, wherein the verifying step further comprises transmitting, from the called apparatus to the calling apparatus, a command frame representative of partial page request PPR data including at least one data frame identification information associated with a data frame to be retransmitted from the data set.

5. The method of claim 1, wherein at least one transmission parameter is changed the method further comprising the step of transmitting a command frame representative of request next command RQN data including a request for transmission of the data set.

6. The method of claim 1, wherein the protocol standard defines a normal operation mode and a polling operation mode, the method further comprising the step of determining an operation mode for the transmitting process.

7. The method of claim 6, wherein the protocol standard is a polling operation mode, the transmitting step further comprising transmitting a data set, including at least one data frame having associated data frame identification information, from the called apparatus to the calling apparatus.

8. The method of claim 6, wherein the protocol standard is a normal operation mode, the transmitting step further comprising transmitting a data set, including at least one data frame having associated data frame identification information, from the calling apparatus to the called apparatus.

9. A communication system, including a calling apparatus and a called apparatus, for transmitting data therebetween over an asynchronous digital network during a transmitting process in accordance with a protocol standard, wherein the calling apparatus and the called apparatus generate a plurality of command frames and at least one data frame during the transmitting process, the system comprising:

(a) handshake means for exchanging a plurality of preliminary command frames, including error correction method ECM capabilities data, between the calling apparatus and the called apparatus;

(b) means for initiating an error correction operation;

(c) a transmitter for transmitting a data set, including at least one data frame having associated data frame identification information, between the calling apparatus and the called apparatus; and (d) verification means for verifying receipt of the data set.

10. The system of claim 9, further comprising:

(i) means for transmitting a first command frame, including data representative of calling apparatus identification information, and a second command frame, including data representative of error correction method ECM information, from the calling apparatus to the called apparatus; and (ii) means for transmitting a third command frame, including data representative of called apparatus identification information, and a fourth command frame, including data representative of error correction method ECM information, from the called apparatus to the calling apparatus.

11. The system of claim 9, further comprising means for transmitting, from the called apparatus to the calling apparatus, a command frame representative of end of page detect EDT including an end of page query.

12. The system of claim 9, further comprising means for transmitting, from the called apparatus to the calling apparatus, a command frame representative of partial page request PPR data including at least one data frame identification information associated with a data frame to be retransmitted from the data set.

13. The system of claim 9, wherein at least one transmission parameter is changed, the system further comprising means for transmitting a command frame representative of request next command RQN data including a request for transmission of the data set.

14. The system of claim 9, wherein the protocol standard defines a normal operation mode and a polling operation mode, the system further comprising means for determining an operation mode for the transmitting process.

15. The system of claim 14, wherein the protocol standard is a polling operation mode, the system further comprising means for transmitting a data set, including at least one data frame having associated data frame identification information, from the called apparatus to the calling apparatus.

16. The system of claim 14, wherein the protocol standard is a normal operation mode, the system further comprising means for transmitting a data set, including at least one data frame having associated data frame identification information, from the calling apparatus to the called apparatus.

* * * * *